US008151296B2

(12) United States Patent
Hassell et al.

(10) Patent No.: US 8,151,296 B2
(45) Date of Patent: *Apr. 3, 2012

(54) INTERACTIVE PROGRAM GUIDE WITH CONTINUOUS DATA STREAM AND CLIENT-SERVER DATA SUPPLEMENTATION

(75) Inventors: Joel G. Hassell, Arvada, CO (US);
William L. Thomas, Malvern, PA (US);
Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,503

(22) Filed: Feb. 12, 2010

(65) Prior Publication Data
US 2010/0146552 A1    Jun. 10, 2010

Related U.S. Application Data

(63) Continuation of application No. 09/332,625, filed on Jun. 11, 1999, now Pat. No. 7,694,319.

(60) Provisional application No. 60/106,714, filed on Nov. 2, 1998, provisional application No. 60/109,140, filed on Nov. 20, 1998.

(51) Int. Cl.
*H04N 7/10* (2006.01)
*H04N 7/025* (2006.01)
(52) U.S. Cl. ........... 725/34; 725/32; 725/35; 725/36; 725/40; 725/42; 725/50; 725/58; 725/136
(58) Field of Classification Search .......... 725/32, 725/35–36, 40, 42, 48–50, 136, 58
See application file for complete search history.

(56) References Cited

U.S. PATENT DOCUMENTS

| 4,355,415 A | 10/1982 | George et al. |
| 4,488,179 A | 12/1984 | Kruger et al. |
| 4,605,964 A | 8/1986 | Chard |
| 4,694,490 A | 9/1987 | Harvey et al. |
| 4,718,107 A | 1/1988 | Hayes |
| 4,857,999 A | 8/1989 | Welsh |
| 4,908,707 A | 3/1990 | Kinghorn |

(Continued)

FOREIGN PATENT DOCUMENTS

DE     198 14 254     10/1998

(Continued)

OTHER PUBLICATIONS

Eitz et al, "Teletext Programmed Home Video Recorders (TPV)," Revised Manuscript of Paper presented to the 12th Annual Conference of the Fernesh-und Kiontechnischen Gesellschaft (FKTG) in Mainz, Jun. 2-6, 1986.

(Continued)

*Primary Examiner* — Jason Salce
(74) *Attorney, Agent, or Firm* — Ropes & Gray LLP

(57) ABSTRACT

An interactive television program guide system is provided. An interactive television program guide implemented on user television equipment obtains program guide data from two data delivery mechanisms. Current program guide data is obtained from a continuous data stream. Other program guide data (which may include the current program guide data) is obtained by the program guide from a program guide server. The continuous data stream may also include program and program grouping identifiers. The program guide may perform real-time actions associated with programs identified in the continuous data stream.

26 Claims, 32 Drawing Sheets

U.S. PATENT DOCUMENTS

| | | |
|---|---|---|
| 4,930,158 A | 5/1990 | Vogel |
| 4,959,720 A | 9/1990 | Duffield et al. |
| 4,977,455 A | 12/1990 | Young |
| 5,109,279 A | 4/1992 | Ando |
| 5,134,719 A | 7/1992 | Mankovitz |
| 5,172,413 A | 12/1992 | Bradley et al. |
| 5,200,822 A | 4/1993 | Bronfin et al. |
| 5,253,066 A | 10/1993 | Vogel |
| 5,335,277 A | 8/1994 | Harvey et al. |
| 5,412,720 A | 5/1995 | Hoarty |
| 5,442,389 A | 8/1995 | Blahut et al. |
| 5,485,197 A | 1/1996 | Hoarty |
| 5,485,219 A | 1/1996 | Woo |
| 5,517,257 A | 5/1996 | Dunn et al. |
| 5,524,195 A | 6/1996 | Clanton, III et al. |
| 5,539,449 A | 7/1996 | Blahut et al. |
| 5,544,161 A | 8/1996 | Bigham et al. |
| 5,550,576 A | 8/1996 | Klosterman |
| 5,579,055 A | 11/1996 | Hamilton et al. |
| 5,583,561 A | 12/1996 | Baker et al. |
| 5,583,563 A | 12/1996 | Wanderscheid et al. |
| 5,583,576 A | 12/1996 | Perlman et al. |
| 5,585,838 A | 12/1996 | Lawler et al. |
| 5,589,892 A | 12/1996 | Knee et al. |
| 5,602,582 A | 2/1997 | Wanderscheid et al. |
| 5,630,119 A | 5/1997 | Aristides et al. |
| 5,648,824 A | 7/1997 | Dunn et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,659,350 A | 8/1997 | Hendricks et al. |
| 5,666,645 A | 9/1997 | Thomas et al. |
| 5,684,525 A | 11/1997 | Klosterman |
| 5,694,163 A | 12/1997 | Harrison |
| 5,699,107 A | 12/1997 | Lawler et al. |
| 5,710,815 A | 1/1998 | Ming et al. |
| 5,717,452 A | 2/1998 | Janin et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,760,821 A | 6/1998 | Ellis et al. |
| 5,768,528 A | 6/1998 | Stumm |
| 5,778,182 A | 7/1998 | Cathey et al. |
| 5,781,226 A | 7/1998 | Sheehan |
| 5,796,952 A | 8/1998 | Davis et al. |
| 5,802,284 A | 9/1998 | Karlton et al. |
| 5,805,763 A | 9/1998 | Lawler et al. |
| 5,805,804 A | 9/1998 | Laursen et al. |
| 5,812,123 A | 9/1998 | Rowe et al. |
| 5,818,438 A | 10/1998 | Howe et al. |
| 5,819,019 A | 10/1998 | Nelson |
| 5,828,402 A | 10/1998 | Collings |
| 5,828,945 A | 10/1998 | Klosterman |
| 5,844,620 A | 12/1998 | Coleman et al. |
| 5,915,090 A | 6/1999 | Joseph et al. |
| 5,931,908 A | 8/1999 | Gerba et al. |
| 5,969,748 A | 10/1999 | Casement et al. |
| 6,002,394 A | 12/1999 | Schein et al. |
| 6,005,562 A | 12/1999 | Shiga et al. |
| 6,052,145 A | 4/2000 | Macrae et al. |
| 6,125,259 A | 9/2000 | Perlman |
| 6,177,931 B1 | 1/2001 | Alexander et al. |
| 6,208,335 B1 | 3/2001 | Gordon et al. |
| 6,289,314 B1 | 9/2001 | Matsuzaki et al. |
| 6,324,694 B1 | 11/2001 | Watts et al. |
| 6,341,195 B1 | 1/2002 | Mankovitz et al. |
| 6,389,593 B1 | 5/2002 | Yamagishi et al. |
| 6,400,406 B1 | 6/2002 | Kim |
| 6,401,242 B1 * | 6/2002 | Eyer et al. .................. 725/35 |
| 6,418,556 B1 | 7/2002 | Bennington et al. |
| 6,463,585 B1 | 10/2002 | Hendricks et al. |
| 6,601,103 B1 | 7/2003 | Goldschmidt Iki et al. |
| 6,601,107 B1 | 7/2003 | Seibert |
| 6,631,523 B1 | 10/2003 | Matthews, III et al. |
| 6,675,384 B1 | 1/2004 | Block et al. |
| 2002/0090203 A1 | 7/2002 | Mankovitz |

FOREIGN PATENT DOCUMENTS

| | | |
|---|---|---|
| EP | 0 662 771 | 7/1995 |
| EP | 0 758 833 | 2/1997 |
| EP | 0 854 645 | 7/1998 |
| JP | 08-070451 | 3/1996 |
| JP | 08-289267 | 11/1996 |
| JP | 09-284741 | 10/1997 |
| JP | 10-013756 | 1/1998 |
| JP | 10-208327 | 8/1998 |
| JP | 10-510120 | 9/1998 |
| WO | WO 88/04507 | 6/1988 |
| WO | WO 94/14281 A1 | 6/1994 |
| WO | WO-95/19091 | 7/1995 |
| WO | WO 96/07270 | 3/1996 |
| WO | WO 97/13368 | 4/1997 |
| WO | WO 97/46943 | 12/1997 |
| WO | WO 97/47124 | 12/1997 |
| WO | WO 98/00975 | 1/1998 |
| WO | WO 98/26528 | 6/1998 |
| WO | WO 98/37695 | 8/1998 |
| WO | WO 99/03267 | 1/1999 |
| WO | WO 99/45700 | 9/1999 |

OTHER PUBLICATIONS

Eitz et al, "Videotext Programmiert Videoheimgerate," Rundfunktechnische Mitteilungen, vol. 30 (1986).

"Electronic Programme Guide (EPG); Protocol for a TV Guide using electronic data transmission" by European Telecommunication Standards Institute, May 1997, Valbonne, France, Publication No. ETS 300 707.

European Search Report mailed Feb. 6, 2008 (Application No. 06023429.1).

"Digital Video Broadcasting (DVB); DVB specification for data broadcasting", European Telecommunications Standards Institute, Draft EN 301 192 V1.2.1 (Jan. 1999).

Heller, "VPS—Ein Neues System Zur Beitragsgesteuerten Programmaufzeichnung," Rundfunktechnische Mitteilungen, Jul.-Aug. 1985, pp. 161-169.

Heller, "VPS a New System for Domestic VCR Start/Stop by Programme Labels Transmitted Within the Insertion Data Line," Symposium Record, Broadcast Sessions, 14th International TV Symposium, Montreux, Switzerland, Jun. 6-12, 1985, pp. 345-351.

Hofmann et al., "Videotext Programmiert Videorecorder," Rundfunktechnische Mitteilungen, Nov.-Dec. 1982, pp. 254-257.

Kruger, "Das Digitale Fernsehkennungssystem ZPS," Nachrichtentechnische Zeitschrift, Jun. 1982, pp. 368-376.

"Pre-Programming Domestic Video Equipment via Teletext (VPV)," Revised Manuscript of Talk given at the 12 Annual Meeting of the Television Cinematic Technical Socity (FRTG) in Mainz, Jun. 2-6, 1986.

Sommerhauser, "Flexible Programmieren Mit VPS," Funkschau 25, 1985, pp. 47-51.

"Windows 98 Feature Combines TV, Terminal and the Internet," New York Times, Aug. 18, 1998.

Zeisel et al, "An Interactive Menu-Driven Remote Control Unit for TV-Receivers and VC-Recorders," IEEE Transactions on Consumer Electronics, vol. 34, No. 3, Aug. 1998.

* cited by examiner

VIDEO FOR CURRENT PROGRAM

Do You Wish To Record MTV After Hours?

Yes　No

FIG. 14a

INTERACTIVE PROGRAM GUIDE WITH CONTINUOUS DATA STREAM AND CLIENT-SERVER DATA SUPPLEMENTATION

This application is a continuation of application Ser. No. 09/332,625, filed Jun. 11, 1999 which claims the benefit of U.S. provisional patent application No. 60/106,714, filed Nov. 2, 1998 and U.S. provisional patent application No. 60/109,140, filed Nov. 20, 1998, the contents of which are incorporated herein by reference in their entirety.

BACKGROUND OF THE INVENTION

This invention relates to interactive television program guide systems, and more particularly, to interactive television program guide systems in which an interactive television program guide obtains program guide data using two data delivery mechanisms.

Cable, satellite, and broadcast television systems provide viewers with a large number of television channels. Users have traditionally consulted printed television program schedules to determine the programs being broadcast at a particular time. More recently, interactive television program guides have been developed that allow television program information to be displayed on a user's television. Interactive television program guides, which are typically implemented on set-top boxes, allow the user to navigate through television program listings using a remote control. In a typical program guide, various groups of television program listings are displayed in predefined or user-selected categories. Program listings are typically displayed in a grid or table.

How program listings data is delivered to the program guide may impact overall system performance and the amount of hardware needed at the user's home. One known data delivery approach involves providing a continuous "trickle" data stream of program guide data to the set-top boxes of a number of users, typically on an out-of-band channel. The program guide stores a local copy of the program guide data provided in the continuous data stream. This approach has a number of advantages. Maintaining a local copy of the program guide data at the set-top box allows the program guide to function even if the program guide does not have access to the data stream for an extended period of time. Program guide data is also available to the program guide with no latency. In addition, multiple local data feeds are unnecessary because the program guide can filter its local channel lineup from a single national data feed.

However, this approach requires a significant amount of memory in the set-top box. If an in-band data channel is used, the guide must tune to a channel carrying the data at a regular interval, possibly preventing the user from watching television during that time. If an out-of-band channel is used, a significant amount of time may be required to initially populate the database of program guide data maintained in the set-top box.

In a known Digital Satellite Services (DSS) system, multiple high-speed feeds of various subsets of program guide data are provided to the program guide. This approach suffers from a number of deficiencies. A significant amount of local memory is required to store the data in the satellite receiver, and the program guide or the satellite receiver must still discard some data when the program guide needs to acquire additional data from one of the feeds. There is a delay when the program guide tunes to and acquires such additional data from a particular feed. The high-speed feeds may also not be formatted to allow all types of searches and sorts on the data.

Another type of satellite system has been proposed in which a combination of a trickle feed and high-speed feeds is used to provide program guide data to the program guide. This approach also requires a significant amount of local memory for storing the program guide data. The system also incurs a delay when the program guide acquires data from different streams.

In a client-server based approach, all of the program guide data may be stored on a remote server that handles program guide data requests from a number of program guides (clients). This approach allows complex requests to be handled with a powerful server rather than a cost-sensitive client device. However, there may be delays associated with accessing the server, especially during times of peak usage. This may result in delays in fundamental operations, such as channel changing. Also, because no data is stored locally by the program guide, the program guide becomes non-functional if the connection to the server is broken.

It is therefore an object of the present invention to provide an interactive television program guide system in which the program guide may obtain program guide data using multiple data delivery mechanisms and thereby provide a robust system in which the amount of memory required for the user's home program guide equipment and the latency for accessing program guide data are minimized.

SUMMARY OF THE INVENTION

This and other objects of the present invention are accomplished in accordance with the principles of the present invention by providing an interactive television program guide system in which program guide data is obtained by an interactive program guide from a continuous stream of program guide data and from a program guide server.

A main facility provides program guide data to a television distribution facility. The television distribution facility provides some of the program guide data (e.g., current program listings data which may include data for program listings for the current time slot and for the next few hours) over a continuous data stream to a number of program guides. Each program guide is implemented on user television equipment associated with a user. The television distribution facility also stores program guide data in a program guide server and provides the stored program guide data to the program guides using a client-server arrangement.

The television distribution facilities may also transmit program and program grouping identifiers (e.g., identifiers for series, mini-series, orderable packages of programs, etc.) in the continuous data stream. The program guides may perform real-time actions associated with programs identified in the continuous data stream.

This approach has a number of advantages over other known systems. For example, the cost of the user's television equipment may be reduced because the memory requirements of the television equipment are minimized. In addition, current data which is needed frequently is available more quickly because a connection to a remote server need not be established before the data is obtained, as is required with a pure client-server approach. By sending frequently-used data in a broadcast stream, the total number of required network connections and the total amount of data to be transferred may be reduced. This may significantly reduce the total network load associated with the television distribution facility.

The program guide server may perform complicated searches and sorts. This may reduce the computational demands placed on the user television equipment and may relieve the user television equipment of the burden of performing database management tasks. In addition, by delivering program guide data using two separate data delivery mechanisms, a robust system may be provided in which some program guide data may still be obtained by the program guide even if the communications line used by one of the delivery mechanisms is interrupted.

Further features of the invention, its nature and various advantages will be more apparent from the accompanying drawings and the following detailed description of the preferred embodiments.

BRIEF DESCRIPTION OF THE DRAWINGS

FIGS. 14a and 14b show illustrative overlays that may be displayed by the program guide to provide a user with the opportunity to confirm the recording of a program.

DETAILED DESCRIPTION OF THE PREFERRED EMBODIMENTS

Figure 1:
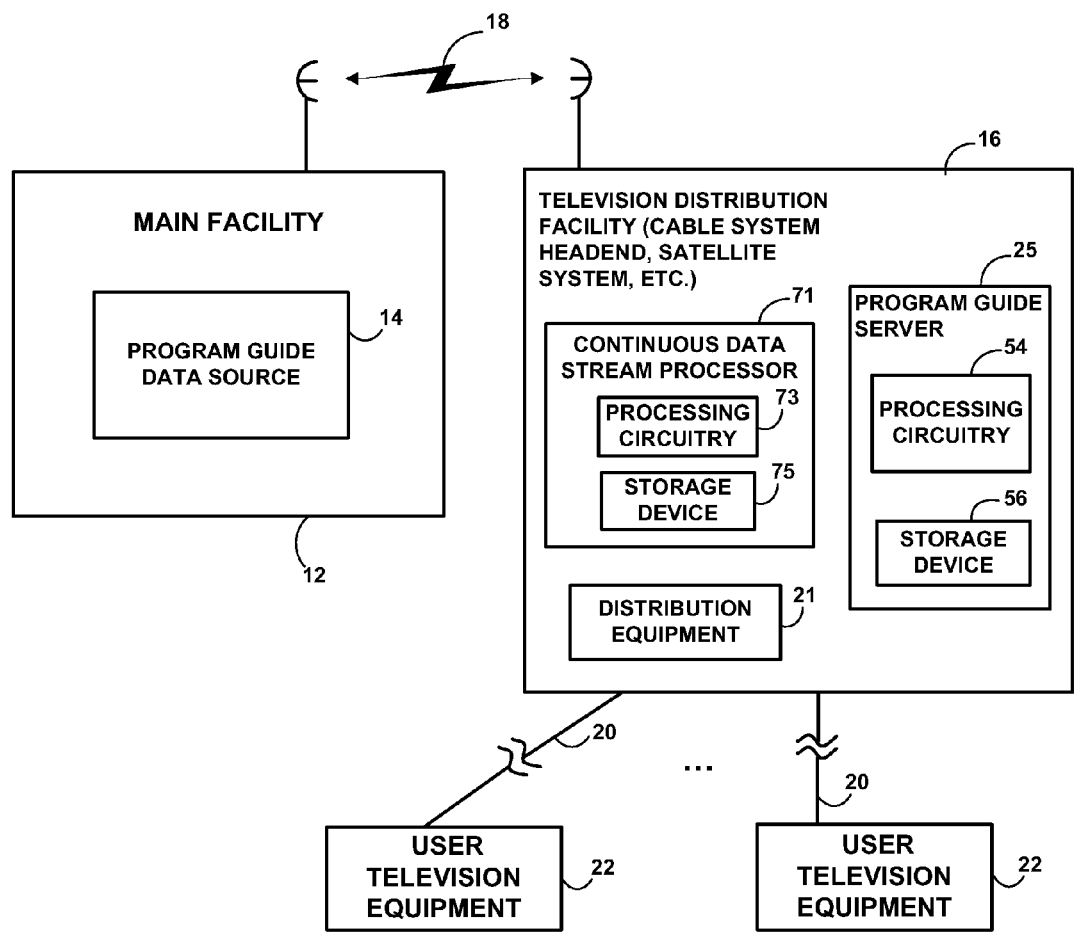
FIG. 1 is a schematic block diagram of an illustrative system in accordance with the principles of the present invention.

An illustrative interactive television program guide system 10 in accordance with the present invention is shown in FIG. 1. Main facility 12 provides program guide data from program guide data source 14 to television distribution facility 16 via communications link 18. There are preferably numerous television distribution facilities 16, although only one such facility is shown in FIG. 1 to avoid over-complicating the drawing. The program guide data transmitted by main facility 12 to television distribution facility 16 may include television program listings data (e.g., program times, channels, titles, and descriptions) and other program guide data for additional services other than television program listings (e.g., additional program information, pay-per-view ordering information, weather information, news information, associated Internet web links, advertisement graphics, videos, etc.). The program guide data may also include unique identifiers for each showing of each program, identifiers for program groupings (e.g., series, mini-series, orderable packages of programs, etc.), or any other suitable identifier.

Link 18 may be a satellite link, a telephone network link, a cable or fiber optic link, a microwave link, an Internet link, a combination of such links, or any other suitable communications link. If it is desired to transmit video signals over link 18 in addition to data signals, a relatively high bandwidth link such as a satellite link may generally be preferred to a relatively low bandwidth link such as a telephone line. Television distribution facility 16 may be any suitable distribution facility (e.g., a cable system headend, a broadcast distribution facility, a satellite television distribution facility, or any other suitable type of television distribution facility). Television distribution facility 16 may distribute the program guide data that it receives from main facility 12 to multiple users over communications paths 20 using distribution equipment 21.

Distribution equipment 21 may be any combination of hardware and software suitable for distributing program guide data to user television equipment 22. Distribution equipment 21 may include, for example, suitable transmission hardware for distributing program guide data on a television channel sideband, in the vertical blanking interval of a television channel, using an in-band digital channel, using an out-of-band digital signal, or by any other suitable data transmission technique. Video signals (e.g., television programming) may also be provided by distribution equipment 21 to user television equipment 22 over communications paths 20 on multiple television channels.

Communications paths 20 may be any communications paths suitable for distributing program guide data in a continuous data stream and using a client-server approach. Communications paths 20 may include, for example, a satellite link, a telephone network link, a cable or fiber optic link, a microwave link, an Internet link, a data-over-cable service interface specification (DOCSIS) link, a combination of such links, or any other suitable communications link.

Television distribution facility 16 may have program guide server 25. Program guide server 25 may be based on any suitable combination of server software and hardware. Program guide server 25 may retrieve program guide data from storage device 56 in response to program guide data requests generated by interactive television program guides implemented on user television equipment 22. As shown in FIG. 1, program guide server 25 may include processing circuitry 54 and storage device 56. Processing circuitry 54 may include any suitable processor, such as a microprocessor or group of microprocessors, and other processing circuitry such as caching circuitry, direct memory access (DMA) circuitry, input/output (I/O) circuitry, etc. Storage device 56 may be a memory or other storage device, such as random access memory (RAM), read only memory (ROM), flash memory, a hard disk drive, etc., that is suitable for storing the program guide data transmitted to television distribution facility 16 by main facility 12. Program guide data may be stored on storage device 56 in any suitable format (e.g., a Structured Query language (SQL) database).

Processing circuitry 54 may process requests for program guide data by searching the program guide data stored on storage device 56 for the requested data, retrieving the data, and providing the retrieved data to distribution equipment 21 for distribution to user television equipment 22. Alternatively, program guide server 25 may transmit program guide data to user television equipment 22 directly. If communications paths 20 include an Internet link, DOCSIS link, or other high speed computer network link (e.g., 10BaseT, 100BaseT, 10BaseF, T1, T3, etc.), for example, processing circuitry 54 may include circuitry suitable for transmitting program guide data and receiving program guide data requests over such a link.

Program guide server 25 may communicate with user television equipment 22 using any suitable communications protocol. For example, program guide server 25 may use a communications protocol stack that includes transmission control protocol (TCP) and Internet protocol (IP) layers, sequenced packet exchange (SPX) and internetwork packet exchange (IPX) layers, or any other suitable layer or combination of layers. User television equipment 22 may also include suitable hardware for communicating with program guide server 25 over communications paths 20 (e.g., Ethernet cards, modems (digital, analog, or cable), etc.)

The program guide on user television equipment 22 may retrieve program guide data from program guide server 25 using any suitable client-server based approach. The program guide may, for example, pass SQL requests as messages to program guide server 25. In another suitable approach, the program guide may invoke remote procedures that reside on program guide server 25 using one or more remote procedure calls. Program guide server 25 may execute SQL statements for such invoked remote procedures. In still another suitable approach, client objects executed by the program guide may communicate with server objects executed by program guide server 25 using, for example, an object request broker (ORB). This may involve using, for example, Microsoft's Distributed Component Object Model (DCOM) approach.

Program guide server 25 may also store program videos, video clips, or audio clips on storage device 56. The videos or clips may be distributed to user television equipment 22 using any suitable video-on-demand ("VOD") or near-video-on-demand ("NVOD") approach. Program guide server 25 may, for example, receive video requests from user television equipment 22 over communications paths 20, retrieve the requested videos from storage device 56 and pass the retrieved videos to distribution equipment 21 for distribution to user television equipment 22. Program guide server 25 may, for example, store videos as Moving Pictures Experts Group (MPEG) MPEG-2 files on storage device 56. Processing circuitry 54 of program guide server 25 may include, for example, circuitry suitable for converting the stored MPEG-2 files into National Television Standards Committee (NTSC) video for distribution by distribution equipment 21.

In another suitable approach, program guide server 25 may transmit the videos directly to user television equipment 22 over communications path 20 as, for example, an MPEG data stream. In this approach, user television equipment 22 may include, for example, suitable hardware and software for receiving and decoding the MPEG data stream and displaying the videos for the user.

Television distribution facility 16 may have multiple program guide servers 25 but only one program guide server 25 has been drawn to avoid over-complicating the drawing. If television distribution facility 16 has multiple program guide servers 25, each of the program guide servers may be assigned a different group of users and process that group's requests for program guide data. Alternatively, different program guide servers 25 may be responsible for processing requests for different types of program guide data for all users. One program guide server 25 may, for example, process requests for program listings information and another may process requests for videos. In still another suitable approach, multiple program guide servers 25 may share the burden of processing requests using a suitable dynamic load sharing approach.

If desired, some of the program guide servers 25 associated with a particular television distribution facility may be deployed at various network nodes within the distribution network (depicted as communications paths 20) for that television distribution facility. Program guide servers 25 may also be Web or other types of Internet servers located outside of television distribution facility 16. To simplify the present discussion, such servers may be treated as though they are located at television distribution facility 16.

Television distribution facility 16 may also have continuous data stream processor 71. Continuous data stream processor 71 may be based on any combination of software and hardware suitable for selecting a portion of the program guide data provided by main facility 12 for inclusion in a continuous data stream transmitted to user television equipment 22. Continuous data stream processor 71 has been shown as separate from program guide server 25, but the two systems may be combined if desired.

Continuous data stream processor may, for example, have processing circuitry 73 and optional storage device 75. Processing circuitry 73 may include any suitable processor, such as a microprocessor or group of microprocessors, and other processing circuitry such as cashing circuitry, direct memory access (DMA) circuitry, input/output (I/O) circuitry, etc. Optional storage device 75 may be a memory or other storage device, such as a random access memory (RAM), read only memory (ROM), flash memory, a hard disk drive, etc., that is suitable for storing program guide data.

Continuous data stream processor 71 may obtain program guide data for the continuous data stream using any suitable approach. Main facility 12 may, for example, periodically transmit program guide data for the continuous data stream to television distribution facility 16 where it may be stored by continuous data stream processor 71. Alternatively, program guide data may be transmitted continuously by main facility 12 to television distribution facility 16 and distributed by continuous data stream processor 71. The data may be received by television distribution facility 16 and provided to continuous data stream processor 71 or, the data may be received directly by continuous data stream processor 71 without passing through television distribution facility 16 (e.g., when continuous data stream processor 71 is not located in television distribution facility 16). Alternatively, program guide server 25 may store program guide data on storage device 56 and provide program guide data to continuous data stream processor 71. Program guide server 25 may provide program guide data to continuous data stream processor 71 continuously, periodically, in response to requests from continuous data stream processor 71, using a polling scheme, or using any other suitable approach.

If necessary, continuous data stream processor 71 or program guide server 25 may localize the program guide data received from main facility 12. Localization of the program guide data is accomplished by extracting program guide data for channels and services that are provided by a particular television distribution facility 16 and discarding the rest of the data. Localization may also involve making local changes to the data (e.g., changing channel names to local channel names). Continuous data stream processor 71 or program guide server 25 may store all of the received data or only data that is required locally (e.g., the extracted data).

Alternatively, continuous data stream processor 71 may continuously filter program guide data that is not of interest locally out of a continuous data stream provided by main facility 12. Continuous data stream processor 71 may also, for example, prioritize program guide data by assigning the frequency with which different types of program guide data will be cycled in the continuous data stream. After continuous data stream processor 71 obtains program guide data for the continuous data stream (e.g., from main facility 12 or program guide server 25), and assigns priorities to the different types of data, it passes the data to program guide distribution equipment 21 for distribution. Distribution equipment 21 may, for example, modulate the data onto an out-of-band channel in cycles according to the assigned priorities.

The interactive program guide obtains program guide data in two different ways. First, program guide data is retrieved by the program guide from the continuous data stream of program guide data that is transmitted by television distribution facility 16 to user television equipment 22 over communications path 20. In order to reduce the total bandwidth required by the continuous data stream, the program guide data transmitted as part of the continuous data stream is limited to the subset of the program guide data selected by continuous data stream processor 71. In particular, the subset of program guide data may be current program guide data (i.e., data related to programs that are currently being broadcast or that are scheduled to be broadcast in the next few hours). The continuous data stream may include, for example, the channel number or other unique identifier for each channel, the call letters of each channel, the start and end time and data for the current program on each channel, the start and end time and data for the next few upcoming programs on each channel, current and upcoming program titles, current and upcoming program ratings, current and upcoming program categories, a unique identification number related to the specific showing of a specific program, or any suitable combination thereof.

The continuous data stream may, for example, carry program listings data for all channels in the current time slot, for all channels in the current time slot and for the next few hours, or for any other suitable combination of program listings. The amount of program listings data carried in the continuous data stream may be limited by the bandwidth allocated to the data stream based on the practiced transmission scheme, or by the amount of other types of program guide data carried by the continuous data stream.

The information in the continuous data stream should be cycled at a fairly high rate so that the latency to access any particular item of data in the data stream is minimal, preferably a fraction of a second. If desired, the data may be processed by the program guide substantially in real-time with minimal or no data caching. Even if a significant amount of data caching is involved, the program guide need never store a significant amount of the data from the continuous data stream in the set-top box. Moreover, the program guide need not maintain a local database of data from the continuous data stream.

If desired, hardware filtering circuitry may be provided in user television equipment 22. This allows hardware filtering to be used to ease the processing burden imposed on the program guide. Program guide data for each channel may be transmitted in the continuous data stream and tagged, for example, with a channel identifier. Channel-by-channel, the program guide may load a filter register in the user television equipment with the ID of a channel of interest, so that the user television equipment may filter out the data for all other channels from the continuous data stream.

The program guide may prefetch data from the continuous data stream to minimize data access latency and thereby allow program guide data to be cycled less often. The program guide may prefetch data based on predictions of what data a user is likely to need, and when performing any function that accesses the continuous data stream. For example, if a user is browsing through program listings, the program guide may prefetch listings from the continuous data stream for the next time slot in the browse. Program listings and other information may, for example, be prefetched for a higher or lower channel when the user flips channels. If the program guide provides the user with the ability to tune to the last channel, the program guide may prefetch or cache already retrieved information for the most recently tuned channel. If, for example, the program guide provides the user with the opportunity to tune to favorite channels, the program guide may prefetch data from the continuous data stream for the next and the previous favorite channels. In still another suitable approach, the program guide may prefetch program guide data as a user enters a channel number on, for example, remote control 40. For example, when a user enters a "2", the program guide may prefetch data for channels 2, 20-29, 200-299, etc. When a user enters the next digit, for example, a "3", the program guide may prefetch the data for channels 23, 230-239, etc. This list of approaches is only illustrative. Prefetching may be performed by the program guide for any function that requires data from the continuous data stream.

Different types of data in the continuous data stream may be sent at different rates (e.g., based on priorities assigned by continuous data stream processor 71). For example, call letters and the data related to the current program may be repeated twice each second or faster, while the data related to the upcoming program may be sent on the order of once each second. These repetition rates are merely illustrative. If desired, other repetition rates may be used. For example, data relating to the current program may be provided at a rate greater than twice per second (such as ten times per second).

Distribution equipment 21 preferably distributes the continuous stream of current data to user television equipment 22 out-of-band so that the program guide data is continuously available to the program guide. Alternatively, program guide data may be transmitted in-band over a dedicated analog channel, in the vertical blanking interval of a number of analog channels, or using any other suitable approach. If the continuous data stream is transmitted in-band over multiple channels, it may, for example, contain only data associated with the channel in which it is transmitted.

The continuous data stream may also be transmitted as one or more digital data tracks on one or more digital channels. One suitable approach may involve multiplexing different groups of digital channels onto different analog channels and transmitting a continuous digital data stream for each group. Another suitable approach may involve distributing programmer provided in-band information (e.g., Program and System Information Protocol for Terestrial Broadcast and Cable (PSIP) information, Digital Video Broadcast (DVB) System Information (SI), etc.). This approach may eliminate the need for continuous data stream processor 71.

It may also be desirable for television distribution facility 16 to distribute multiple continuous data streams. Each continuous data stream may, for example, correspond to different types or categories of program guide data. Each continuous data stream may, for example, carry data for creating different popular program guide display screens (e.g., one stream may carry listings for the current hour, one stream may carry listings for movies, etc.). It may also be desirable, for example, to distribute a continuous data stream of program listings for each menu option of a main menu screen.

The second way that the interactive program guide implemented on user television equipment 22 obtains program guide data is from program guide server 25 using client-server techniques. Program guide server 25 may store program guide data in any suitable format, such as in the form of a SQL database. The interactive program guide may obtain program guide data from program guide server 25 by, for example, invoking a remote procedure call on program guide server 25, issuing messages or requests, or using suitable object based communications (any suitable combination of which are hereafter collectively referred to as "requests") via communications path 20. Program guide server 25 may process requests by querying storage device 56 for program guide data that satisfies the request. Program guide server 25 retrieves the requested program guide data from storage device 56. Distribution equipment 21 may distribute the retrieved data over one of communications paths 20 to the particular program guide that generated the request using, for example, an Internet-based addressing scheme. Alternatively, program guide server 25 may distribute the program guide data to user television equipment 22 directly over the communications path 20.

Program guide server 25 may reduce the time needed to access the program guide data using any suitable approach. Program guide server 25 may, for example, extract data needed to construct each of the most popular program guide display screens ahead of time and provide this pre-extracted data in response to requests. Program guide server 25 may also, for example, perform any necessary database joins required to build one or more intermediate tables of program guide data. This may relieve user television equipment 22 of the processing burden associated with such tasks.

In addition, configuration information and user settings (e.g., favorite channel settings and the like) may be stored by user television equipment 22 or by program guide server 25. Frequently accessed settings are preferably stored by user television equipment 22, but may be prefetched based on a prediction by the program guide of the user's next likely action.

Figure 2:
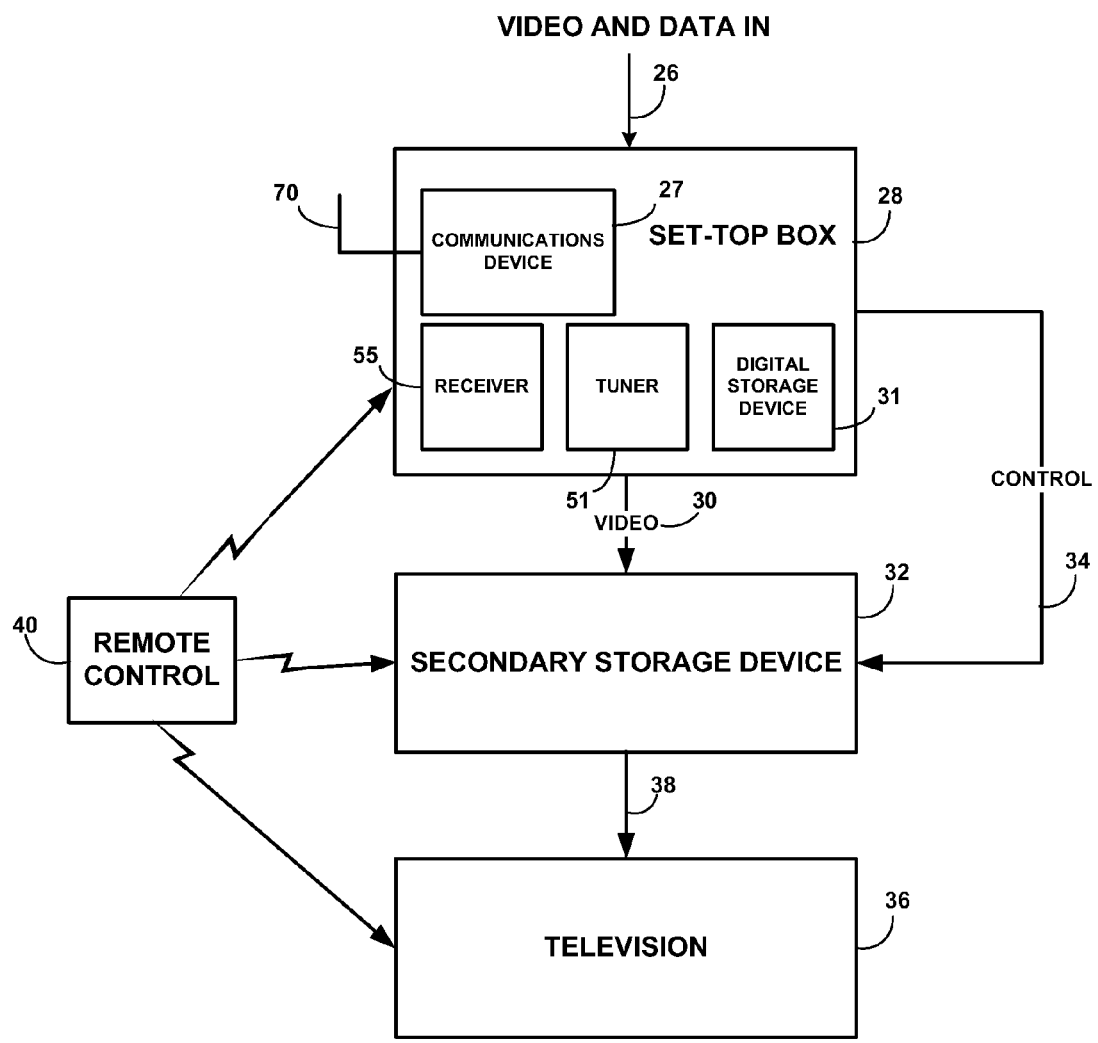
FIG. 2 is a schematic block diagram of illustrative user television equipment in accordance with the principles of the present invention.

An illustrative arrangement for user television equipment 22 is shown in FIG. 2. Receiver 55 receives television programming and data from television distribution facility 16 (FIG. 1) at input 26. Receiver 55 may be based on any suitable hardware and software for receiving program guide data and television programs. During normal television viewing, tuner 51 of set-top box 28 tunes to a desired television channel based on inputs from the user on remote control 40. Tuner 51 may be based on any suitable hardware and software for tuning to analog or digital television channels.

Multiple tuners may be provided, but only one has been shown to avoid over-complicating the drawing. If multiple tuners are provided, the user's viewing (or playing) of a program may not be interrupted when the program guide obtains data. If, for example, program guide data is provided in-band on a dedicated analog channel, one tuner 51 may tune to an analog channel carrying television programming while another tuner 51 may tune to the dedicated channel. Alternatively, one tuner may be used to access the continuous data stream, and another to access program guide server 25. Program guide systems that use multiple tuners to obtain in-band data are described, for example, in concurrently filed Ellis U.S. patent application Ser. No. 09/330,860. By using multiple tuners, the program guide may access program guide data without interrupting the display of television programming.

If user television equipment 22 has only a single tuner 51, television viewing may be interrupted when tuner 51 tunes to a separate channel to obtain in-band data (if provided on a dedicated channel, or, for example, when the user browses through channels) or data from program guide server 25. It may be desirable, therefore, to provide graphics, audio, or, video, in the continuous data stream that may be displayed or played by the program guide when the program guide obtains data not carried in-band on the channel the user is watching. If user television equipment 22 has multiple tuners, graphics, audio, or video carried in the continuous data stream may be displayed or played while the program guide obtains data from, for example, program guide server 25 or an in-band data stream on another channel.

The signal for the television channel to which tuner 51 is tuned is provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard). The video signal at output 30 may be received by optional secondary storage device 32.

Set-top box 28 may also include communications device 27 for transmitting requests to program guide server 25 over request communications path 70. Communications device 27 may be, for example, a modem (e.g., any suitable analog digital telephone dialup modem, or a cable modem), network interface card (e.g., an Ethernet card), or any other device suitable for transmitting requests to program guide server 25. Request communications path 20 is preferably a return-path on communications path 20, but may be a separate suitable communications path.

Secondary storage device 32 can be any suitable type of analog or digital program storage device or player (e.g., a videocassette recorder, a digital video disc (DVD) player with recording capabilities, etc.). Program recording and other functions may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

The interactive television program guide may run on set-top box 28, on television 36 (if television 36 has suitable processing circuitry and memory), or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

If desired, set-top boxes 28 may be used that contain digital storage devices such as digital storage device 31 that allow the user to record programs and program data in digital form. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and an appropriate interface. If necessary, processing circuitry in set-top box 28 may be used to format the received video, audio, and data signals into a digital file format. The file format may be an open file format such as the Moving Pictures Expert Group (MPEG) MPEG-2 standard. The resulting data may be passed to digital storage device 31 via an appropriate bus (e.g., a bus using the Institute of Electrical and Electronics Engineers (IEEE) 1394 standard) and may be stored on digital storage device 31.

Television 36 receives video and audio signals from secondary storage device 32 via communications path 38. The signals on communications path 38 may either be generated by secondary storage device 32 when playing back a prerecorded storage medium (e.g., a videocassette or a recordable digital video disc), by digital storage device 31 when playing back a prerecorded digital medium, may be passed through from set-top box 28, may be provided directly to television 36 from set-top box 28 if secondary storage device 32 is not included in user television equipment 22, or may be received directly by television 36. During normal television viewing, the signals provided to television 36 correspond to the desired channel to which the user has tuned with set-top box 28. The signals may also be provided to television 36 by set-top box 28 when set-top box 28 is used to play back information stored on digital storage device 31.

Figure 3:
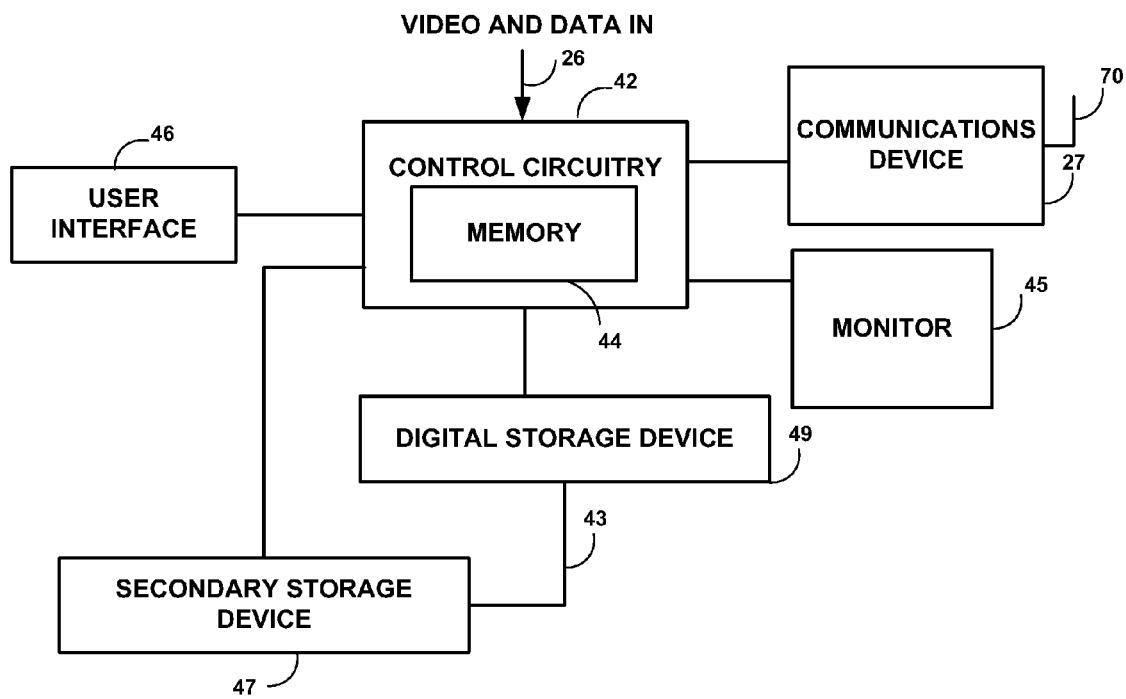
FIG. 3 is a generalized schematic block diagram of portions of the illustrative user television equipment of FIG. 2.

A more generalized embodiment of user television equipment 22 of FIG. 2 is shown in FIG. 3. As shown in FIG. 3, program guide data from television distribution facility 16 (FIG. 1) is received by control circuitry 42 of user television equipment 22. The functions of control circuitry 42 (e.g., obtaining program guide data from the continuous stream of current program guide data, obtaining program guide data from program guide server 25, generating program guide display screens, program recording, etc.) may be provided using the set-top box arrangement of FIG. 3. Alternatively, these functions may be integrated into an advanced television receiver, personal computer television (PC/TV), a personal computer with a television tuner card, or any other suitable arrangement. If desired, a combination of such arrangements may be used.

Control circuitry 42 may include any suitable processor, such as a microprocessor, and suitable support circuitry such as caching circuitry, direct memory access (DMA) circuitry, input/output (I/O) circuitry, etc. Control circuitry 42 may include memory 44. Memory 44 may be any memory or other storage device, such as a random access memory (RAM), read only memory (ROM), flash memory, a hard disk drive, a combination of such devices, etc., that is suitable for storing program guide instructions for execution by control circuitry 42. It should be understood that memory 44 may temporarily cache program guide data when, for example, generating a program guide display screen. Such caching or temporary buffering of data such as the data received from the continuous stream of current program guide data by memory 44 should not be confused, however, with the substantial use of memory in other program guide systems to store a database of program guide data that is refreshed by periodic downloads.

Set-top box 28 may also include communications device 27 for transmitting requests to program guide server 25 over request communications path 70. Communications device 27 may be, for example, a modem (e.g., any suitable analog digital telephone dialup modem, or a cable modem), network interface card (e.g., an Ethernet card), or any other device suitable for transmitting requests to program guide server 25. Request communications path 20 is preferably a return-path on communications path 20, but may be a separate suitable communications path.

User television equipment 22 may also have secondary storage device 47 and digital storage device 49 for recording programming. Secondary storage device 47 can be any suitable type of analog or digital program storage device (e.g., a videocassette recorder, a digital video disc (DVD) player with recording capabilities, etc.). Program recording and other functions may be controlled by control circuitry 42. Digital storage device 49 can be, for example, a writeable optical storage device (such as a DVD player capable of handling recordable DVD discs), a magnetic storage device (such as a disk drive or digital tape), or any other such suitable digital storage device.

The user may control the operation of user television equipment 22 with user interface 46. User interface 46 may be a pointing device, wireless remote control, keyboard, dedicated sets of buttons (e.g., buttons located on various hardware components), touch-pad, voice recognition system, or any other suitable user input device. To watch television, the user may instruct control circuitry 42 to display a desired television channel on monitor 45. To access the functions of the program guide, the user may instruct the program guide to generate a main menu or other desired program guide display screen for display on monitor 45.

When a user indicates a desire to access the interactive television program guide (e.g., by using a "menu" key on remote control 40), the program guide generates an appropriate program guide display screen for display on monitor 45. A main menu screen, for example, such as illustrative main menu screen 100 of FIG. 4, may be generated that provides the user with access to various program guide functions. Main menu screens may also contain various advertisements, logos, etc.

Figure 4:
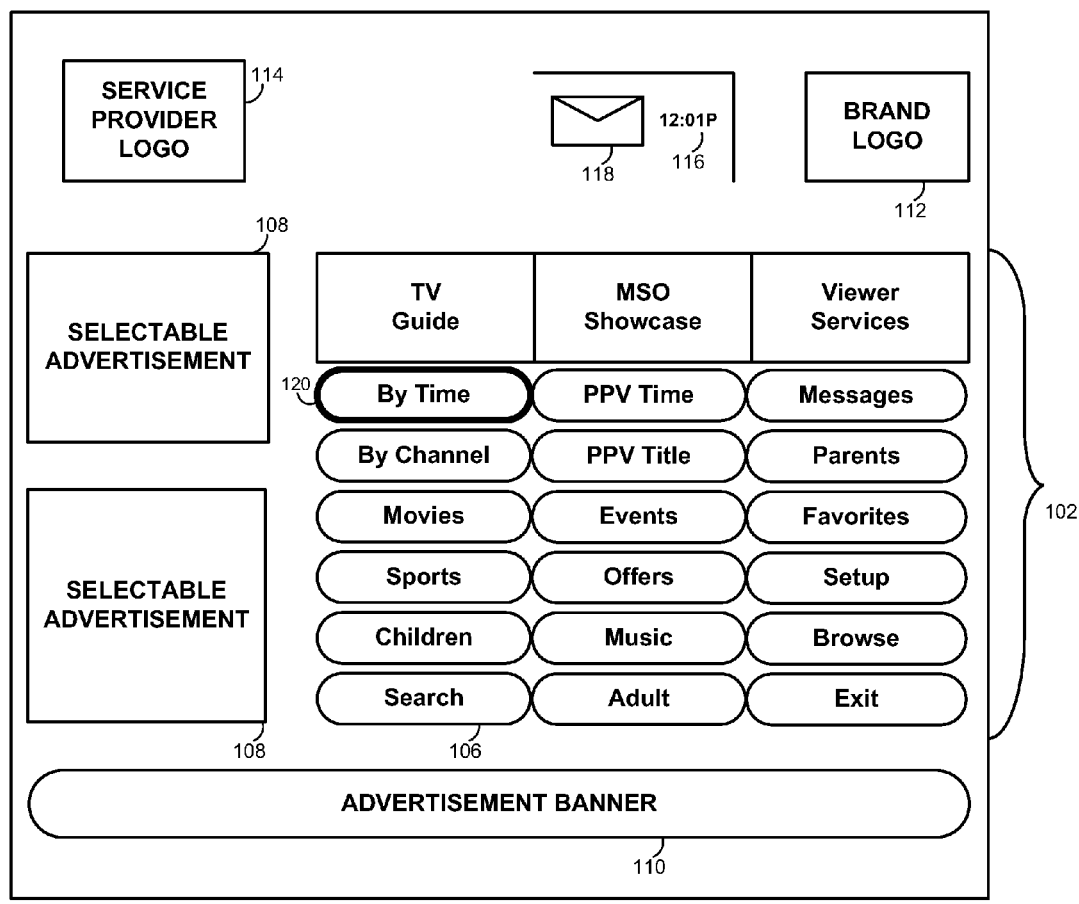
FIG. 4 shows an illustrative main menu screen in which selectable program guide options are displayed for the user.

Illustrative main menu screen 100 of FIG. 4, for example, may include menu 102 of selectable program guide options 106. If desired, the program guide options 106 may be organized according to feature type. In menu 102, for example, program guide options 106 have been organized into three columns. The column labeled "TV GUIDE" is for listings related features, the column labeled "MSO SHOWCASE" is for multiple service organization (MSO) related features, and the column labeled "VIEWER SERVICES" is for viewer related features. The interactive television program guide may generate a display screen for a particular program guide feature when the user selects that feature from menu 102.

Main menu screen 100 may include one or more selectable advertisements 108. Selectable advertisements 108 may, for example, include text and graphics advertising pay-per-view programs. When the user selects a selectable advertisement 108, the program guide may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The current time may be displayed in clock display region 116. In addition, a suitable indicator such as indicator graphic 118 may be used to indicate to the user that a message from a cable operator is waiting for the user if the program guide supports messaging functions.

One function of the interactive television program guide may be to provide the user with the opportunity to view television program listings. A user may indicate a desire to view program listings by, for example, positioning highlight region 120 over a desired program guide option. Alternatively, the program guide may present program listings when the user presses a suitable key (e.g., a "guide" key) on remote control 40. When the user indicates a desire to view television program listings, the program guide may obtain program listings data from the continuous data stream or by request from server 25 and may generate an appropriate program listings screen for display on monitor 45. A program listings screen may contain one or more groups or lists of program listings organized according to one or more organization criteria (e.g., by program category).

The program listings screen may be overlaid over a program being viewed by the user or overlaid over a portion of the program in a "browse" mode. The program guide may, for example, provide the user with the opportunity to view listings by time, by channel, according to a number of categories (e.g., movies, sports, children, etc.), or may allow the user to search for a listing by title. Program listings may be displayed using any suitable list, table, grid, or other suitable display arrangement. If desired, program listings display screens may include selectable advertisements, product brand logo graphics, service provider brand graphics, clocks, or any other suitable indicator or graphic.

Figure 5A:
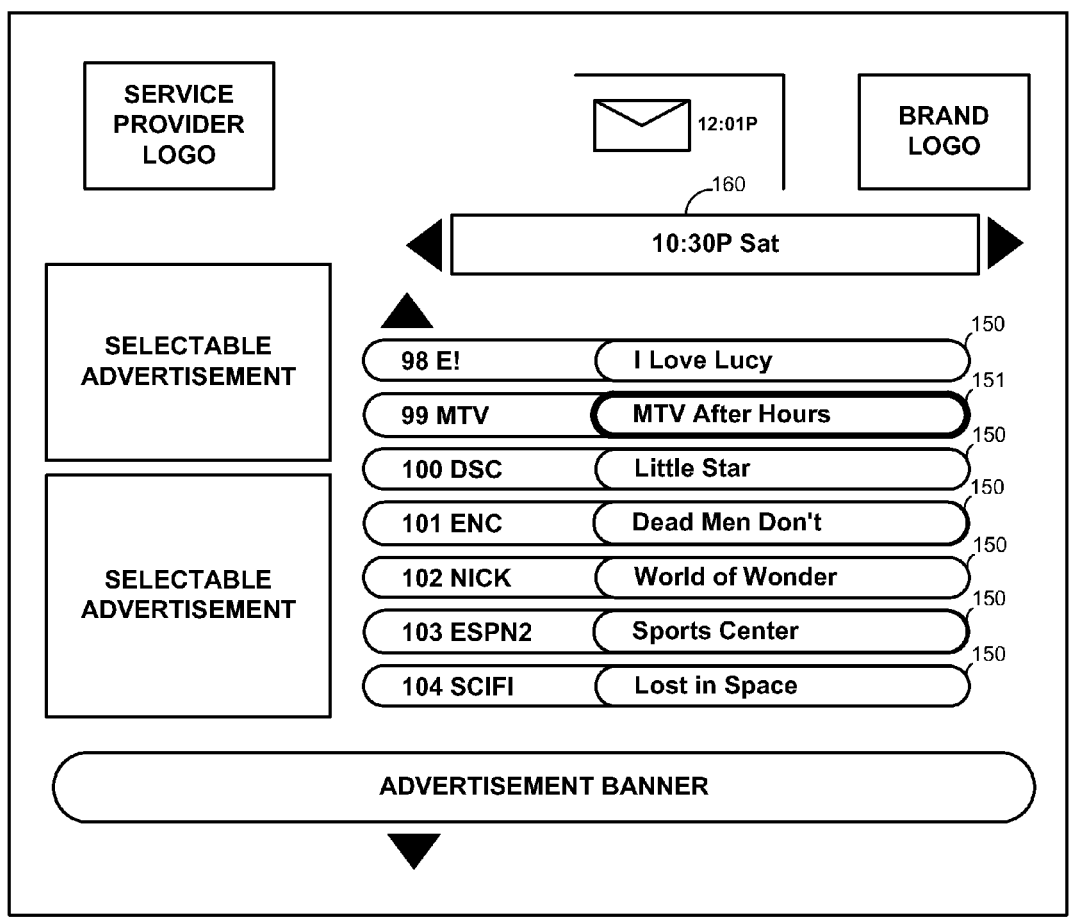
FIGS. 5a and 5b show illustrative display screens in which program listings are displayed by time and by channel, respectively.
Figure 5B:
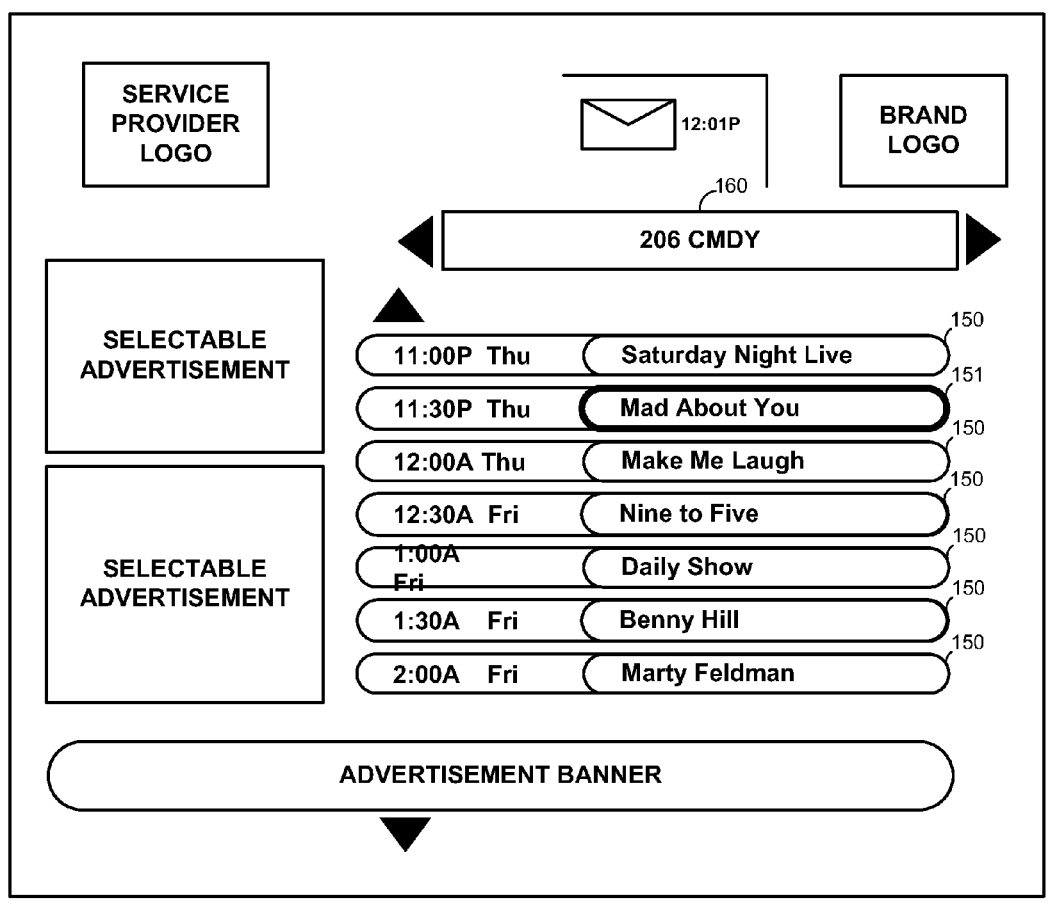

FIGS. 5a and 5b illustrate the display of program listings by time and by channel, respectively. The program listings display screens 130 and 135 of FIGS. 5a and 5b may include highlight region 151, which highlights the current program listing 150. The user may position highlight region 151 by entering appropriate commands with user interface device 52. For example, if user input interface device 52 has a keypad, the user can position highlight region 151 using "up," "down," "left," and "right" arrow keys. Remote program listings may also be panned left, right, up, and down by positioning highlight region 151 using the arrow keys on remote control 40. Alternatively, a touch sensitive screen, trackball, voice recognition device, or other suitable device may be used to move highlight region 151 or to select program listings without the use of highlight region 151. In still another approach, the user may speak a television program listing into a voice request recognition system. These methods of selecting program listings are merely illustrative. Any other suitable approach for selecting program listings may be used if desired.

The program guide may provide the user with the opportunity to view program listings for other times or channels. The user may indicate a desire to access listings for other times or channels by, for example, using "left" and "right" arrow keys to change time slots (when program listings are presented by time as shown in FIG. 5a), or "left" and "right" arrow keys to change channels (when program listings are presented by channel as shown in FIG. 5b). In response to such an indication, the program guide may, for example, scroll or page the program listings to display additional program listings.

The program guide uses the continuous stream of current program guide data as a low-latency source of current program listings and other frequently requested information. The program guide uses server 25 to supply data on request typically when data is needed less urgently. The program guide may, for example, retrieve program listings data from the continuous data stream whenever the data to be retrieved is related to current programming (i.e., programming that is being broadcast or that is scheduled to be available in the next few hours).

If desired, the program guide may be configured to recognize the type of program guide data carried in the data stream (e.g., based on attribute fields in the continuous data stream). If the program guide has the capability to recognize data in the continuous data stream, the program guide may be configured to always attempt to retrieve data from the continuous data stream (either before or at the same time that the program guide attempts to request data from server 25). The program guide may obtain data from the continuous data stream or from program guide server 25 based on when particular program guide functions are accessed. These examples are merely illustrative. The program guide may use these and other suitable techniques for accessing data in the continuous data stream and requesting data from server 25.

As mentioned above, the program guide may be programmed to always retrieve television program listings for the current time of day from the continuous data stream. This may occur, for example, in response to the user indicating a desire to access program listings (e.g., by selecting "by time" feature from main menu screen 100). If the user indicates a desire to see program listings for a time other than the current time of day (e.g., by using remote control arrow keys to select program listings many hours or days in the future), the program guide may generate a request for obtaining those program listings and may transmit the request to program guide server 25 over communications path 20. If desired, the program guide may also prefetch program listings for other time slots from the continuous data stream or program guide server 25.

After a user selects a program listing, the interactive program guide may provide the user with access to a number of program guide functions associated with the selected listing.

The program guide may, for example, provide the user with additional program information for the program listings. This may be done in response to a user indicating a desire to access additional program information by, for example, positioning highlight region 151 (FIGS. 5a and 5b) over a listing 150 and pressing an "info" key on remote control 40.

The program guide may obtain the additional program information by requesting the additional program information from program guide server 25. The program guide makes such requests, for example, whenever the program guide determines that the additional program guide information is not included in the continuous data stream, or if the program guide has been configured to automatically obtain all additional program information from program guide server 25. In practice, additional program information (at least additional program information for programs other than current programs) is preferably not included in the continuous data stream due to bandwidth constraints. Additional program information for a listing or group of listings may, for example, be prefetched from program guide server 25 when a user highlights a particular program listing, when the program guide displays listings on a display screen, or in response to any other suitable event.

Figure 6:
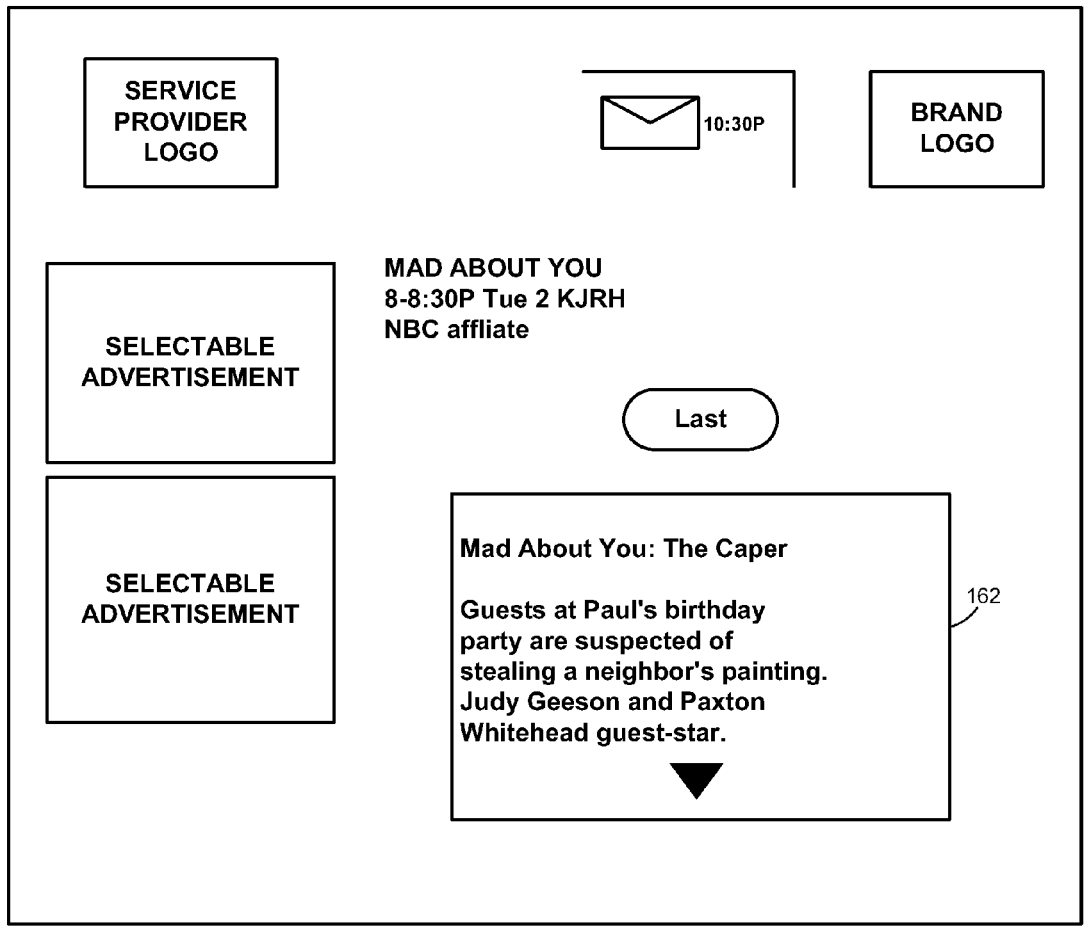
FIG. 6 shows an illustrative additional program information screen.

Once the program guide has obtained the additional program information from the continuous data stream or program guide server 25, the program guide may generate an additional program information screen. An illustrative additional program information screen 161 is shown in FIG. 6. Like other program guide display screens, additional program information screen 161 may include selectable advertisements, service provider logos, brand logos, a mail indicator, and a clock region. Additional program information screen 161 may also include program information window 162 for displaying the additional program information retrieved by the program guide. If a portion of the additional program information extends past the bottom of program information window 162, the user may, for example, use a remote control arrow key to scroll through the additional program information.

The program guide may display program listings organized by category. In practice, such a function may require the program guide to obtain program listings data from program guide server 25, because including category information for the program listings in the continuous data stream may require too much bandwidth, or because sorting program listings based on category attributes may be a heavier processing burden to place on user television equipment 22 than is desired.

If the user selects "Movies," "Sports," or "Children" selectable program guide options 106 of main menu 102 (FIG. 4), for example, the program guide may issue a request to program guide server 25 querying program guide server 25 for program listings of the appropriate category. Alternatively, if the program listings in the continuous data stream are accompanied by category information, the program guide may filter program listings from the continuous data stream based on the appropriate category, and may retrieve additional listings in that category from program guide server 25.

Figure 7:
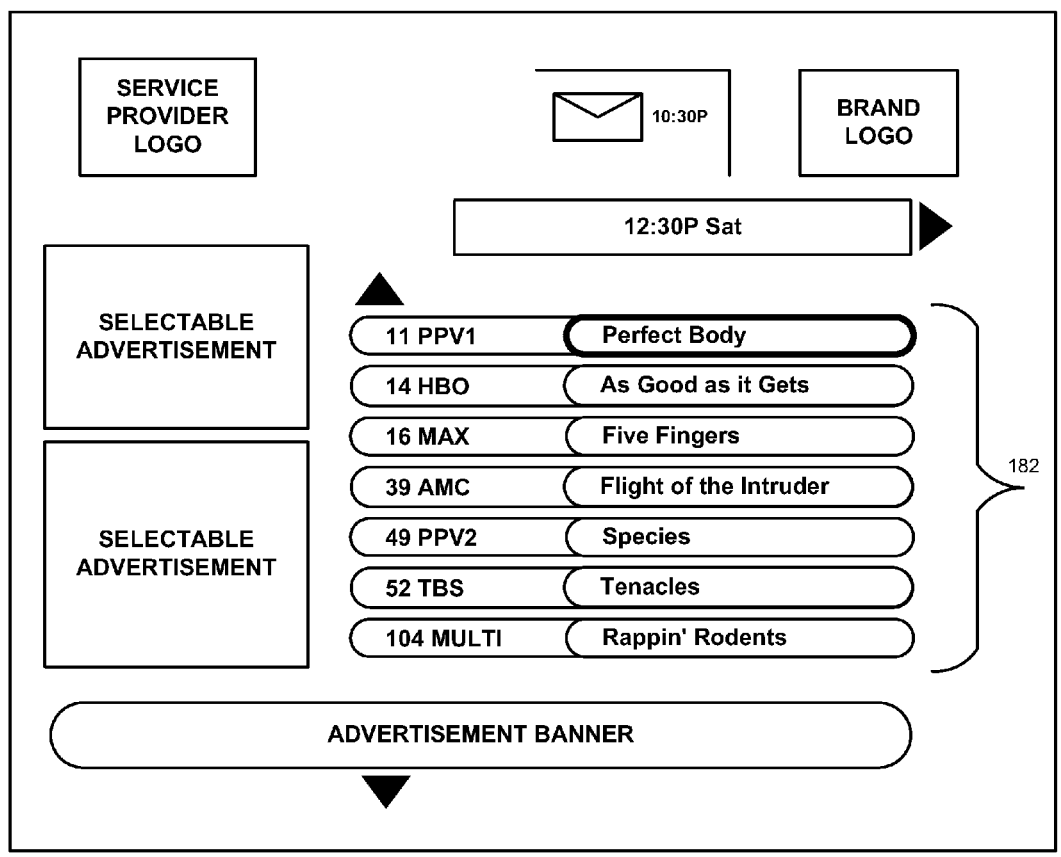
FIG. 7 shows an illustrative program listings by category screen in which program listings are displayed for a particular category.

FIG. 7 shows illustrative program listings by category screen 180 in which program listings for movies are displayed. Program listings by category screen 180 may be generated by the program guide when, for example, the user selects the "Movies" selectable feature 106 of FIG. 4. Similar program listings by category screens 180 may be generated by the program guide in which program listings are sorted by any suitable category.

Program listings by category screen 180 may include, for example, selectable advertisements, service provider logos, brand logos, advertisement banners, a mail indicator, and a clock region. Program listings for the selected category may be displayed in list 182. The program guide may also provide the user with access to additional features related to a particular listing when, for example, the user selects that listing. The user may view program listings for additional time slots or channels on screen 180 by, for example, using remote control arrow keys to manipulate the display.

Figure 8A:
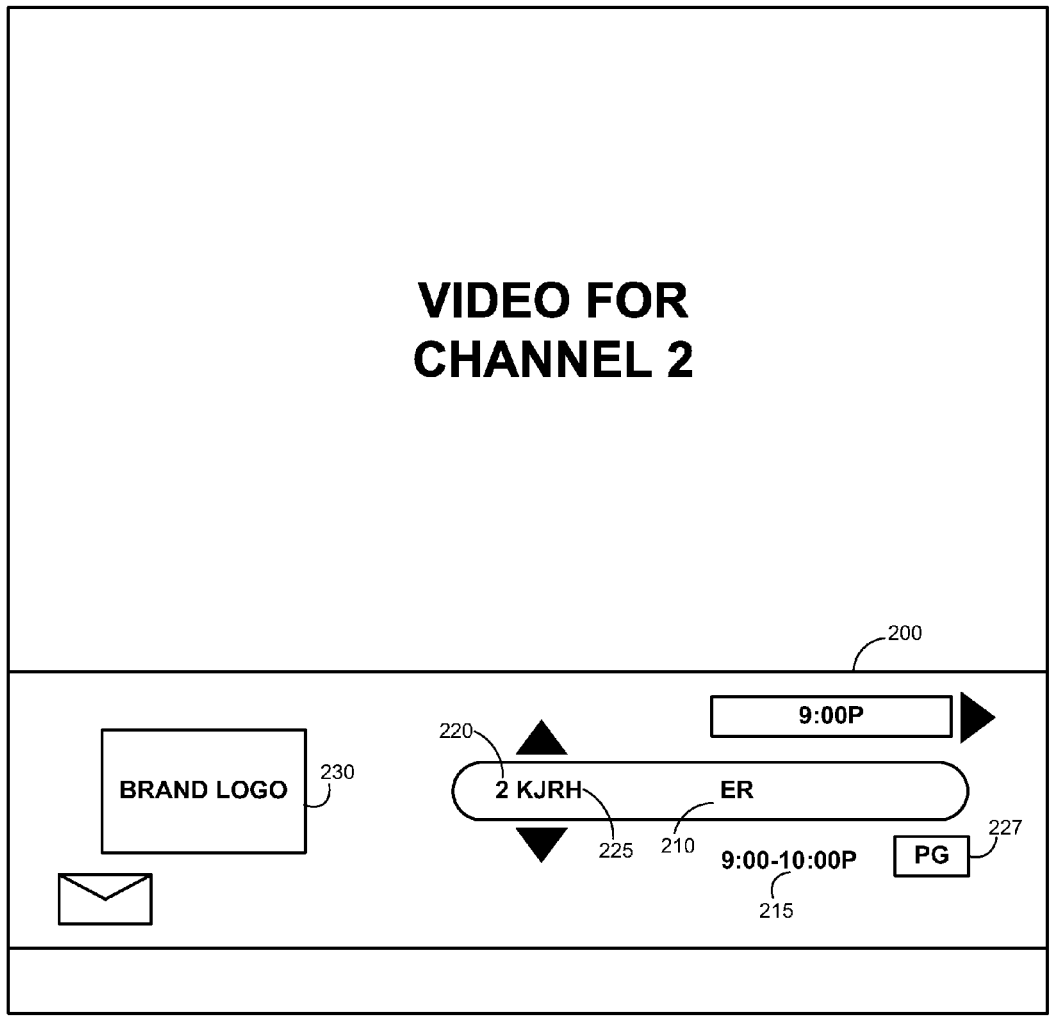
FIG. 8a shows an illustrative FLIP display that may be displayed when the user changes channels.

The interactive program guide may allow the user to view program listings while watching television programming by, for example, overlaying a "FLIP" or "BROWSE" display region over a television program. FIG. 8a shows an illustrative FLIP display 200 that the program guide may display whenever the user changes television channels. The FLIP display may contain information associated with the current program, such as the program title 210, run time 215, the current channel number 216, and the current channel's call letters 225. The FLIP display may also include a number of graphics, such as brand logo 230, a sponsorship graphic, a channel logo graphic, mail indicator or any other suitable graphic. The program's rating may also be displayed. If desired, brand logo 230 may be replaced with or used together with a selectable information icon. The user may select the selectable information icon to obtain additional program information for the program currently displayed in FLIP display 200.

FLIP display 200 may also include rating indicator 227 for indicating the rating of the current program. Rating information may be carried in the continuous data stream. If the program guide provides a parental control feature, the rating of the program on each new channel the user tunes to may be examined by the program guide to determine if the program meets parental control settings that were previously established by the user. If the program rating is not acceptable, the program guide may, for example, display only the FLIP banner without the program video.

Figure 8B:
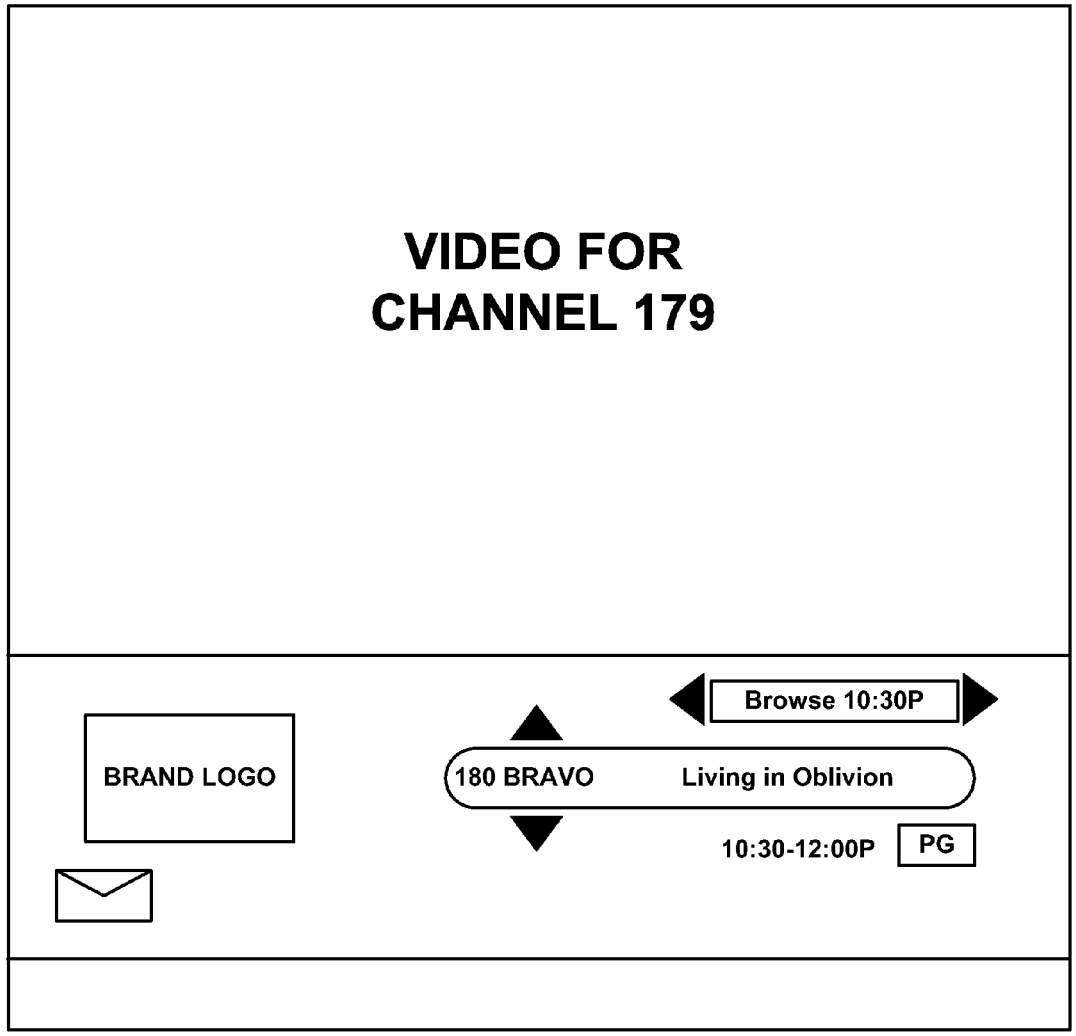
FIG. 8b shows an illustrative BROWSE display that may be displayed when the user indicates a desire to browse through program listings for a given time slot.

FIG. 8b shows an illustrative "BROWSE" overlay or display that the program guide may display when the user opts to browse through program listings for a given time slot. The user may browse through program listings by, for example, using remote control arrow keys.

The FLIP and BROWSE overlays of FIGS. 8a and 8b have been shown as including a brand logo displayed at the left of the overlay. The logo may also, for example, promote different sponsors as the user browses program listings or flips between channels. The logos may change within the same overlay or banner if the user displays the overlay or banner for a predefined time. The logo may, for example, automatically rotate through a list of logo advertisements, returning to the first advertisement after each advertisement in the list has been displayed. The brand logo may also be replaced by a text based advertisement.

Program listings data for the FLIP overlay may be obtained by the program guide from the continuous data stream when the user changes channels. Program listings data for the BROWSE overlay may also be obtained by the program guide from the continuous data stream, but may also be obtained from program guide server 25 if the user indicates a desire to view program listings data not carried in the continuous data stream (e.g., program listings for programs not in the current time slot or program listings for programs more than a few hours in the future). If desired, program listing data may be prefetched for adjacent time slots from program guide server 25 when, for example, FLIP information is displayed, when the user indicates a desire to enter the browse mode, or in response to any other suitable event.

The program guide may provide functions that involve various real-time actions related to the broadcast of a specific program or series. For example, the program guide may allow the user to set reminders, order pay-per-view programs, record programs, lock and unlock programs, etc. These functions involve actions that are performed by the program guide in coordination with programs as they are broadcast. For example, a program guide reminder function may allow a user to set a reminder for upcoming airing of a program. Just before the broadcast of the program, the program guide displays a reminder on the user's television. The reminder alerts the user that the program is about to begin. Thus the program guide action of displaying the program reminder must be coordinated with the broadcast of the program.

If all programs were broadcast at their scheduled broadcast times, the program guide could simply rely upon program listings data provided to the program guide that specifies when each program is to be broadcast. However, programs are sometimes not aired at their scheduled times. This may occur, for example, when a sporting event that precedes a given television program runs longer than expected.

In order to accommodate unexpected shifts in the broadcast times of certain programs, each airing of a program may be assigned a unique identifier. The identifier may be assigned, for example, at main facility 12 and may be distributed by distribution equipment 21. Unique identifiers may also be assigned to program groupings (e.g., series, miniseries, orderable packages of programs, or other suitable groupings of programs). The identifiers associated with each program or program grouping may be provided to the program guide with the program listings data. When a user sets a reminder or uses other such functions, the program guide may store the identifier in memory in user television equipment 22. At an appropriate time (e.g., before or during the broadcast of a program), each unique identifier is placed into the continuous data stream. The program guide may therefore monitor the stream to determine in real-time whether a particular program (e.g., a single program or a program in a program grouping for which a reminder was set) is being broadcast. If the broadcast time of a program shifts, the reminder function will still notify the user at the appropriate time (i.e., just before the program airs).

The unique identifier in the data stream may be transmitted, for example, when a program starts, when a program ends, or continuously during a program. If there are any schedule changes, the unique identifiers for programs whose broadcast times have shifted may be transmitted at the correct times to reflect these changes. Thus, a selected program can be rescheduled for a different time, day, or channel and the associated action will still be performed correctly by the program guide.

When the user first accesses a function of the program guide that involves a real-time action associated with a program or series (e.g., when the user of the program guide sets up a reminder or the like), the program guide may retrieve the unique identifier from the continuous data stream (if it is available) or may request the unique identifier from program guide server 25. The identifier is then stored locally on the user television equipment for future comparison to the identifiers provided in the continuous stream of current data.

The program guide may maintain a list of upcoming actions on user television equipment 22. Preferably, the list of upcoming actions is maintained in a memory such as memory 44 in control circuitry 42 of user television equipment 22 (FIG. 3). The program guide may store the unique identifier and the requested associated action in the list. The program guide may monitor the continuous data stream for unique identifiers and perform listed actions when their associated unique identifiers appear in the continuous data stream. If a unique identifier is for a series, the program guide may perform the listed action every time a program in the series is shown. The program guide may ignore any identifier that appears in the continuous data stream that does not match an action in the list. In addition, the program guide may allow actions to expire and may remove them from the list if the identifier associated with the action is not detected in the continuous data stream for a predefined period of time.

One function that may involve a real-time action associated with a television program is a reminder function. The program guide may provide the user with the opportunity to set a program reminder to be displayed at, for example, the start time of a program. The program guide may present the user with opportunities to set reminders whenever the user indicates an interest in a future program (e.g., by pressing a remote control enter key after highlighting a future program listing), or in response to any other suitable event. The user may indicate a desire to set a program reminder by, for example, pressing a "remind" button on remote control 40.

Figure 9A:
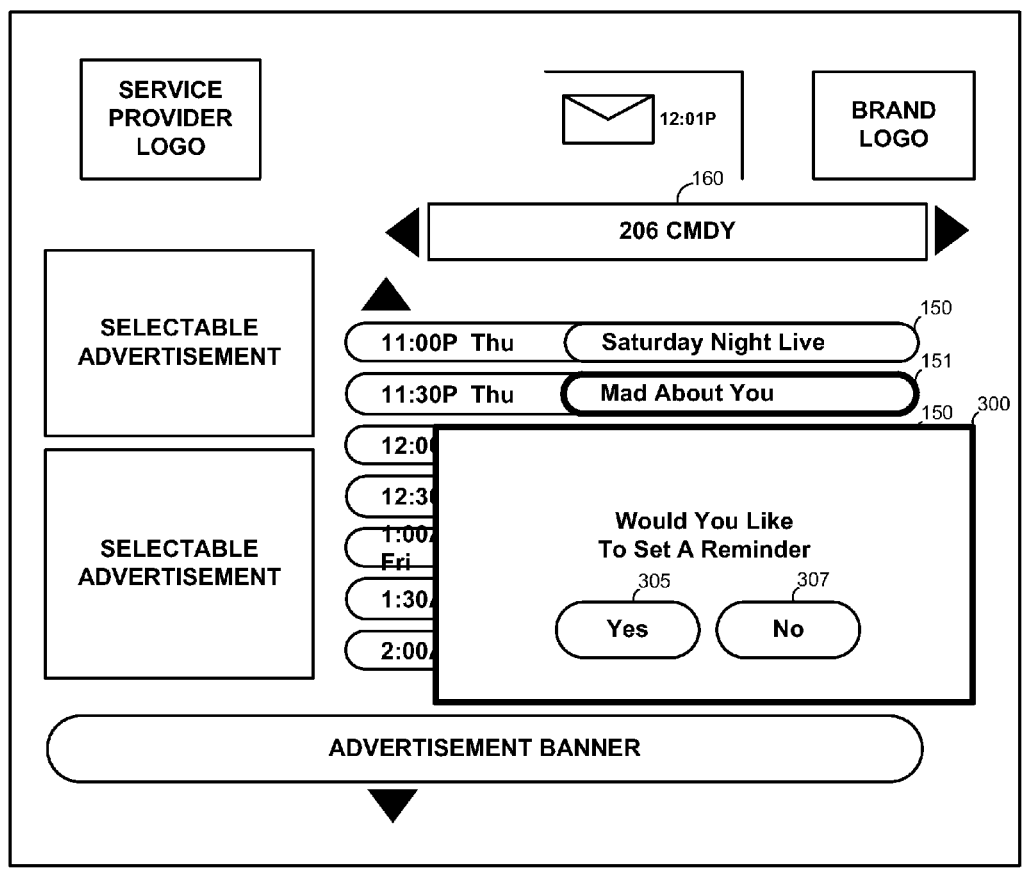
FIGS. 9a and 9b show illustrative reminder set-up and confirmation overlays, respectively.

If the user indicates a desire to set a program reminder by, for example, highlighting a listing in program listing screens 130 or 135 and pressing a "remind" key on remote control 40, the program guide may generate a suitable reminder overlay. FIG. 9a shows illustrative overlay 300. The program guide may prompt the user to set a reminder and provide the user with the opportunity to select, for example, "Yes" button 305 to set the reminder or "No" button 307 to cancel.

Figure 9B:
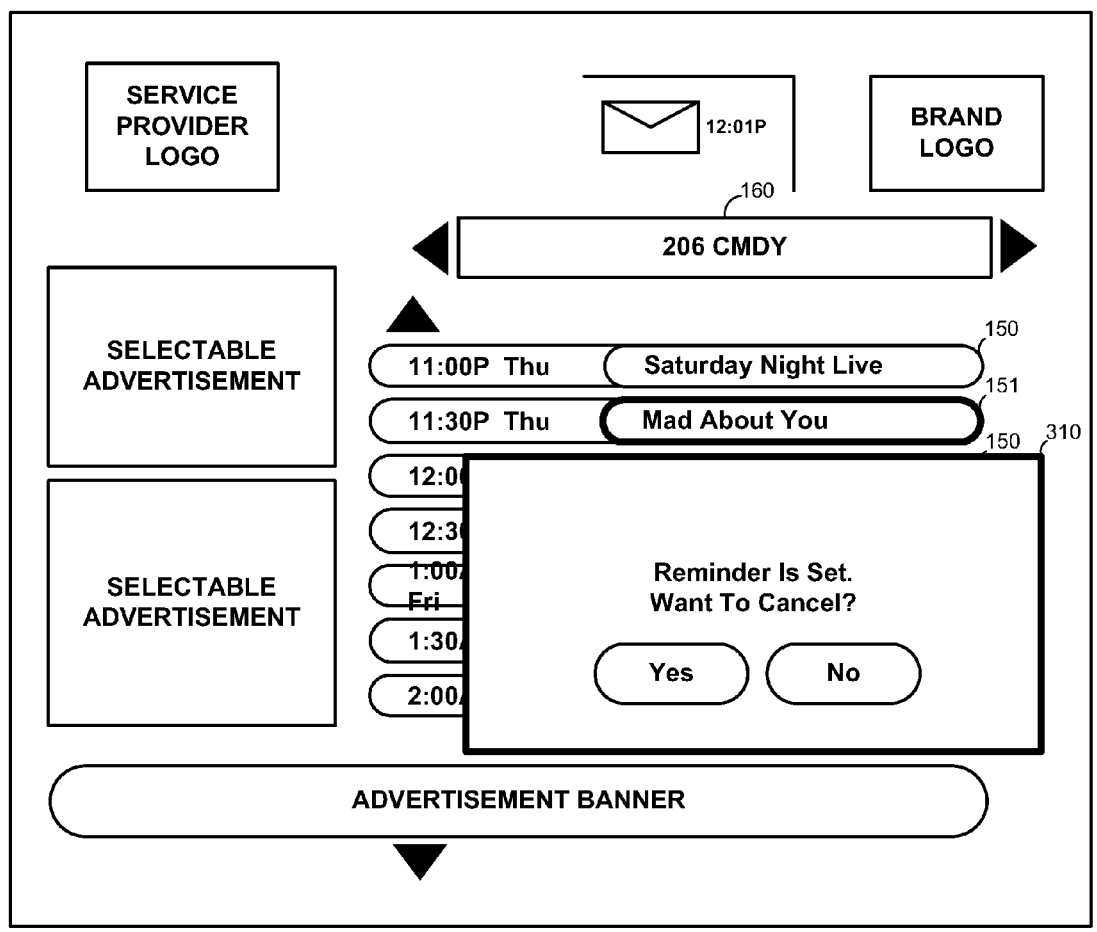

If the user attempts to set a reminder for a program or series for which a reminder has already been set, the program guide may provide the user with the opportunity to cancel the reminder by, for example, displaying reminder confirmation overlay 310 of FIG. 9b. If the user deletes a reminder, the program guide may delete the unique identifier for the selected showing and the associated reminder from the local list of actions.

When the program guide detects the unique identifier for the program for which the reminder was set in the continuous data stream, the program guide checks the local list of scheduled real-time actions and determines that the associated action involves displaying a reminder. The program guide then displays the reminder for the program. Multiple reminders may be displayed simultaneously if desired. In addition, the program guide may, for example, prefetch program listings data and additional program data for a program or group of programs from the continuous data stream or from program guide server 25 when a reminder is displayed.

The program guide may also provide users with the opportunity to set reminders for program groupings. If, for example, a user wishes to receive a reminder for the series "Mad About You" any time an episode in the series is shown, the user may set such a reminder for the series using any suitable approach. Program grouping reminder lists and related display screens are described, for example, in concurrently filed Knudson et al. U.S. patent application Ser. No. 09/330,792, which is hereby incorporated by reference herein in its entirety.

In response to a user indicating a desire to set a reminder for a program grouping, the program guide may store the program grouping identifier in the list of real-time actions. In this example, the program guide would store the program grouping identifiers for the series "Mad About You" in a list of reminders.

Each time an episode in the series "Mad About You" is aired, the program grouping identifier for the series is placed into the continuous data stream. The identifier may, for example, be provided continuously by main facility 12 and passed to distribution equipment 21 from continuous data stream processor 71.

The program guide may monitor the continuous data stream and compare the identifiers in the data stream with the identifiers in the list of real-time actions. When the identifier for the program grouping is found, which in this example would be the program grouping identifier for the series "Mad About You", the program guide performs the associated real-time action (e.g., displays a reminder).

Figure 10A:
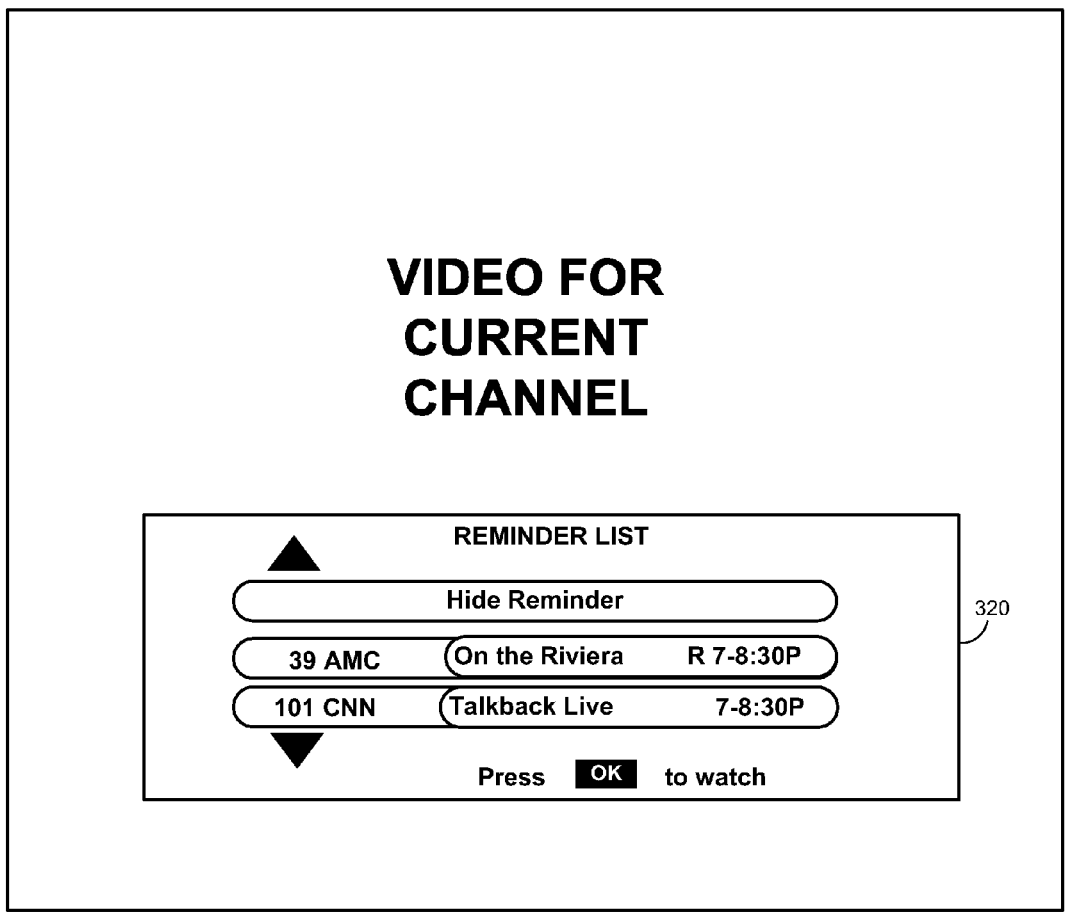
FIGS. 10a and 10b show illustrative reminder lists.
Figure 10B:
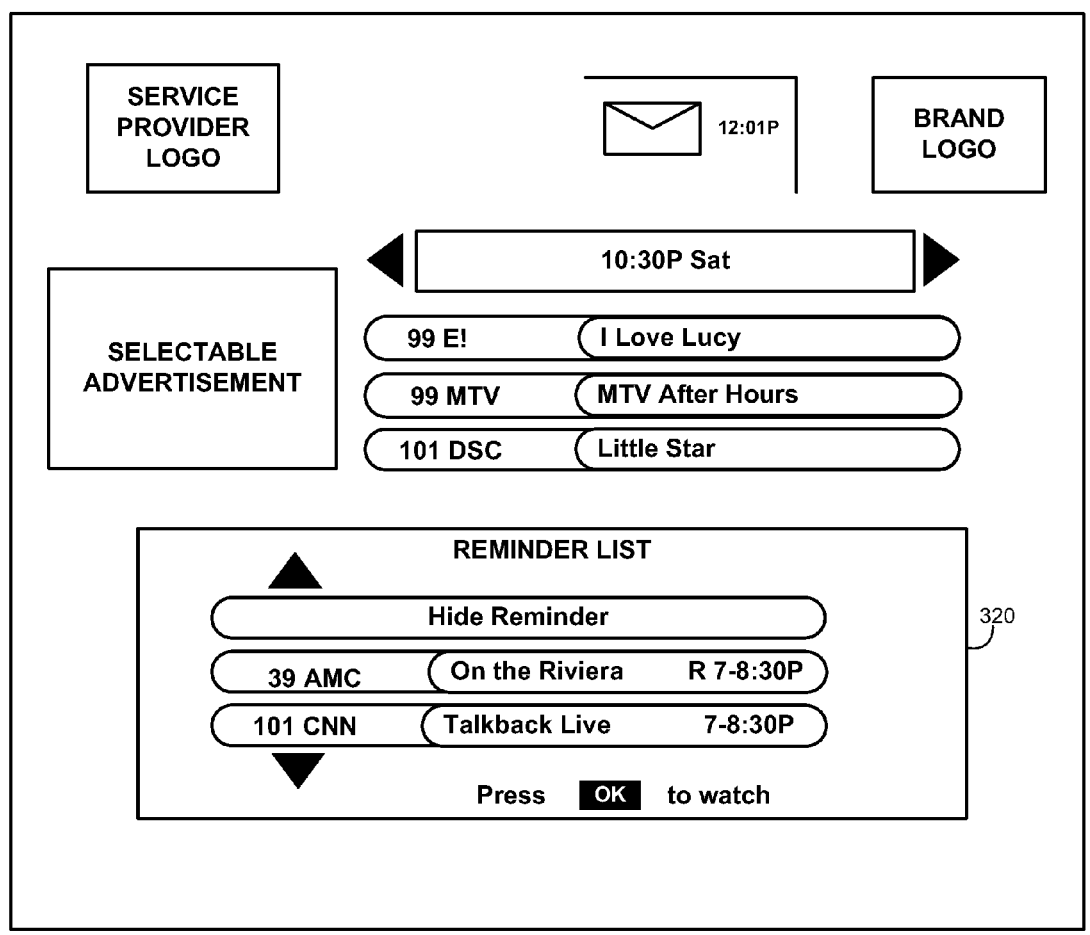

FIGS. 10*a* and 10*b* show illustrative program reminder lists 320. In FIG. 10*a*, reminder list 320 is overlaid on top of the currently display television program to provide the user with the opportunity to view a reminder while still viewing a portion of the television program that the user was watching. In FIG. 10*b*, reminder list 320 is shown overlaid on top of a program listings display screen, such as program listings display screen 130 of FIG. 5*a*. The program guide may provide the user with the opportunity to scroll through reminder list 320 by, for example, using remote control arrow keys.

Another example of a real-time action that may be taken by the program guide is the authorization of the viewing of a pay-per-view program. The program guide may authorize viewing based on when the identifier of the desired pay-per-view program is detected in the continuous data stream, thereby preventing errors if the schedule shifts and the like. The program guide may provide the user with an opportunity to order a pay-per-view program when the user selects a pay-per-view program listing from a group of listings, the user presses an "order" key (or other suitable key) on remote control 40 when tuned to an unordered pay-per-view channel, or in response to any other suitable event.

Figure 11A:
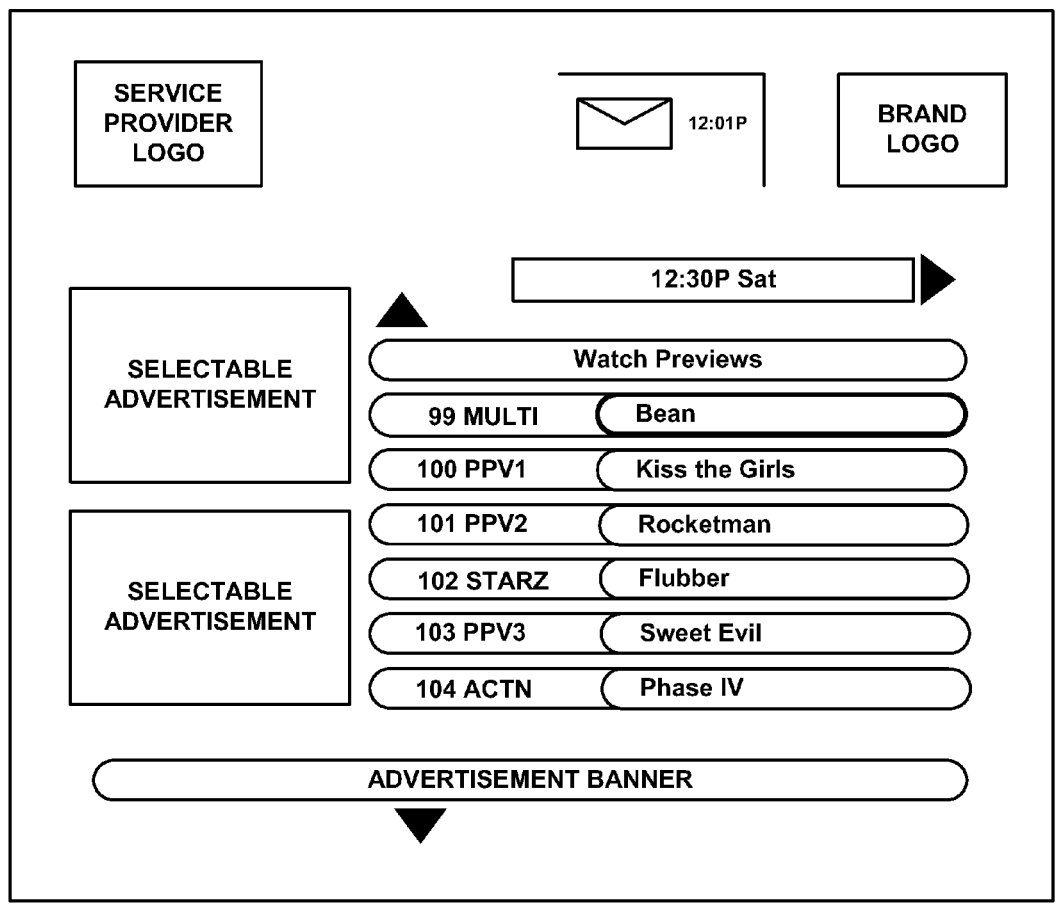
FIG. 11a shows an illustrative pay-per-view program listings display screen.

The program guide may, for example, display a pay-per-view program listings display screen, such as illustrative pay-per-view program listings display screen 350 of FIG. 11*a*, in response to the user selecting "PPV TIME" feature 106 of main menu 102 (FIG. 4). Like program listings display screens 130 and 135 of FIGS. 5*a* and 5*b*, pay-per-view program listings screen 350 may include selectable advertisements, service provider logos, brand logos, a mail indicator, a clock region, etc. The program guide may display listings for pay-per-view programs in other time slots and additional channels when the user presses remote control arrow keys. The program guide may obtain pay-per-view program listings data for display in pay-per-view program listings screen 350 from the continuous data stream or from program guide server 25. As with non-pay-per-view program listings, data for currently available pay-per-view programs and those that are available in the next few hours may be provided in the continuous data stream. Data relating to pay-per-view programs at later times is available on request from server 25.

Figure 11B:
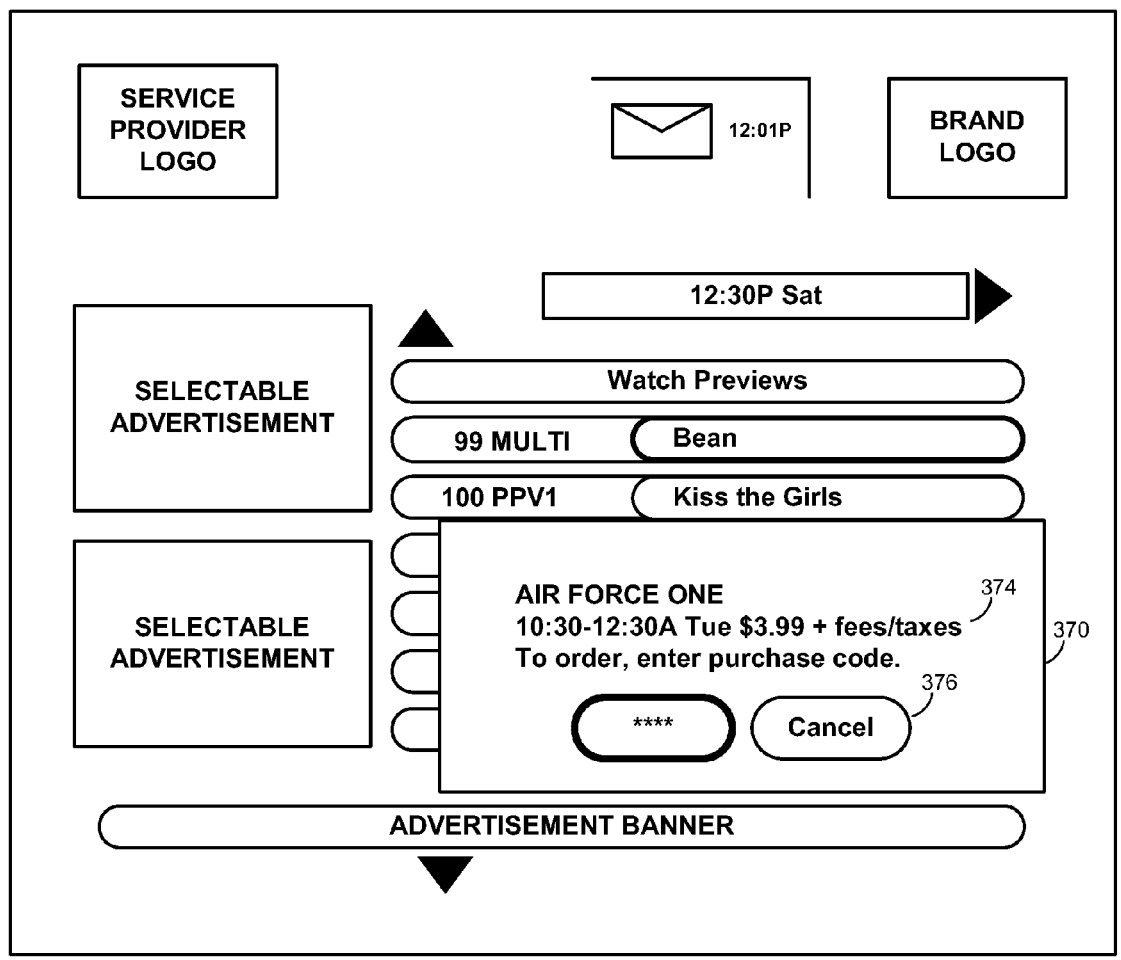
FIG. 11b shows an illustrative pay-per-view ordering overlay.
Figure 11C:
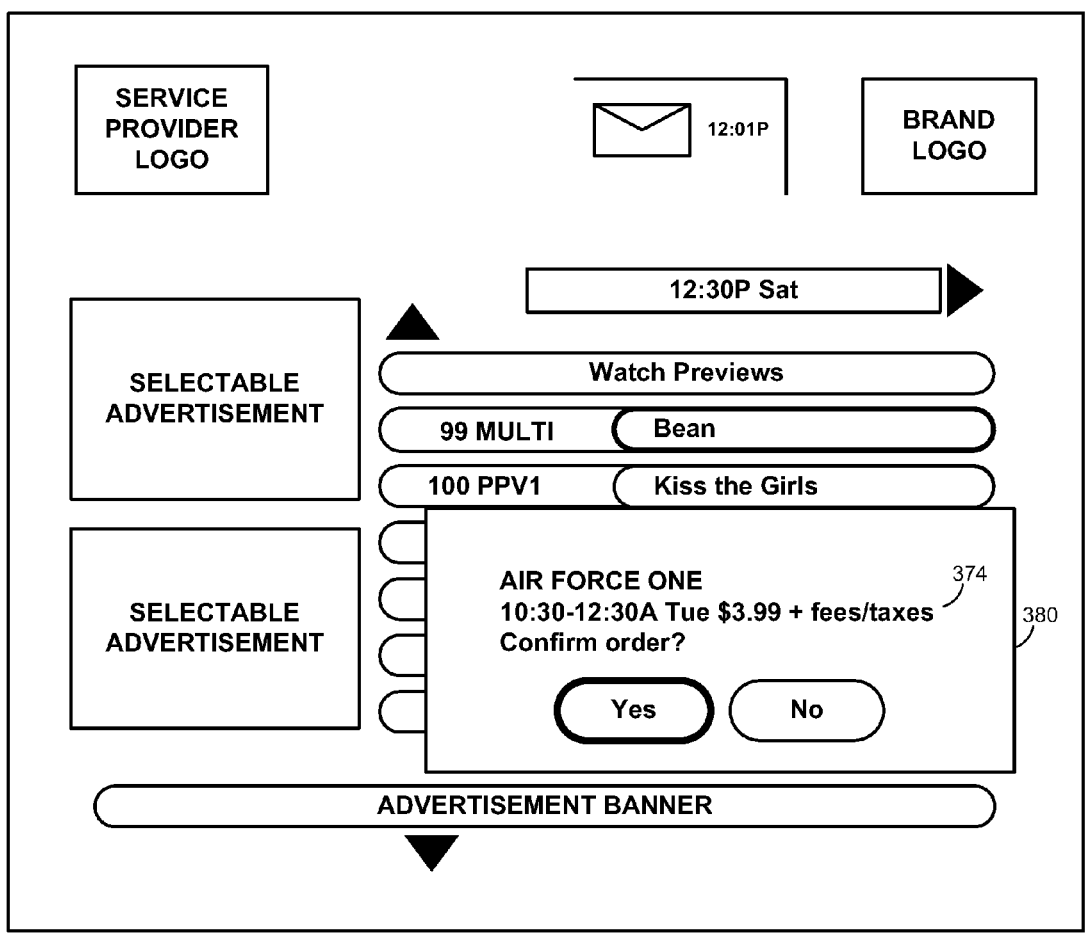
FIG. 11c shows an illustrative pay-per-view order confirmation overlay.

The program guide may provide the user with an opportunity to order a pay-per-view program for a selected listing. An illustrative pay-per-view ordering overlay 370 is shown in FIG. 11*b*. The program guide may display pay-per-view ordering overlay 370 when, for example, the user highlights a pay-per-view program listing and presses an "order" or other suitable key on remote control 40. Pay-per-view ordering overlay 370 may display pay-per-view program information 372 and ordering information 374, and may prompt the user to order the selected pay-per-view program by entering a purchase code. The user may enter the purchase code using, for example, number keys on remote control 40, or may cancel the purchase and return to the last screen by selecting "CANCEL" button 376. The program guide may also provide the user with the opportunity to confirm the pay-per-view order using illustrative order confirmation overlay 380 of FIG. 11*c*. If desired, the program guide may display order confirmation overlay 380 of FIG. 11*c* instead of pay-per-view ordering overlay 370 to provide the user with the opportunity to order a pay-per-view program without requiring the user to enter a purchase code.

Figure 11D:
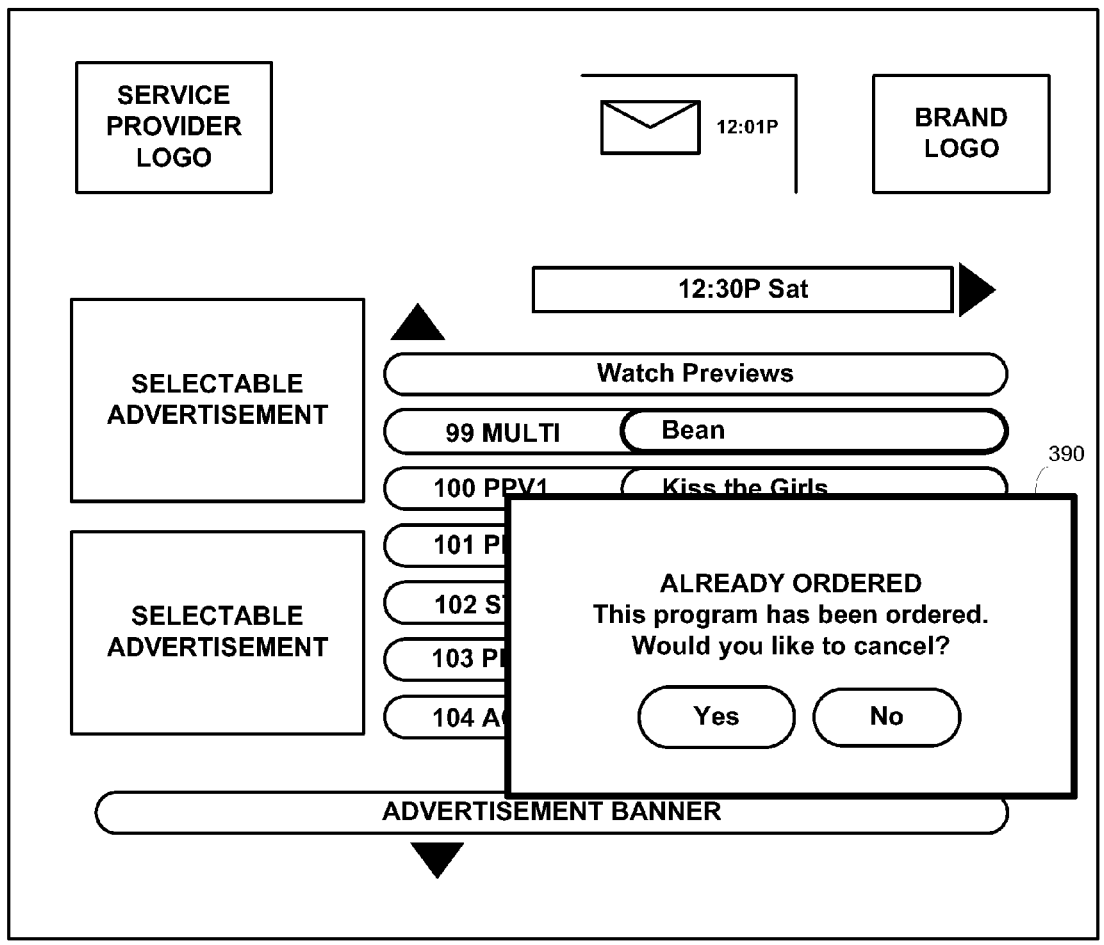
FIG. 11d shows an illustrative overlay in which the program guide indicates to the user that a particular pay-per-view program has been ordered and provides the user with the opportunity to cancel the duplicate order.

The program guide may have obtained the unique identifier for the particular showing of the selected pay-per-view program when it retrieved listings data from either the continuous data stream or program guide server 25. Otherwise, the program guide may query program guide server 25 at this point to obtain the unique identifier. The program guide may search the locally maintained list of upcoming actions for the identifier to determine if the selected pay-per-view program has been ordered. As shown in FIG. 11*d*, the program guide may indicate to the user that the pay-per-view program has already been ordered, and may provide the user with the opportunity to cancel the current order by displaying, for example, overlay 390.

Figure 11E:
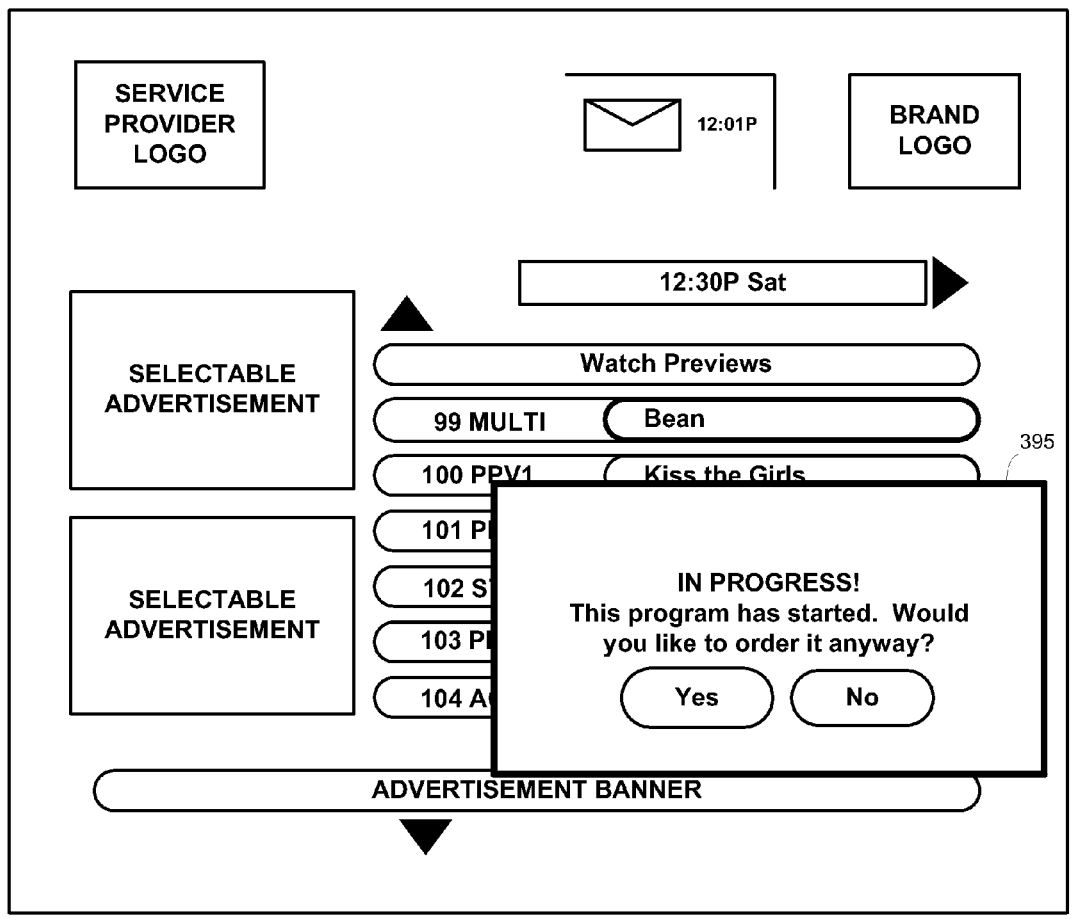
FIG. 11e shows an illustrative overlay in which the program guide indicates to a user that a particular pay-per-view program has started and provides the user with the opportunity to order it anyway.

The program guide may also search the continuous data stream for the unique identifier of the selected pay-per-view program to determine if the selected program is being broadcasted at the time the user is placing the order. As shown in FIG. 11*e*, the program guide may indicate to the user that the program is being shown by, for example, displaying overlay 395, and providing the user with the opportunity to cancel the order.

Figure 12A:
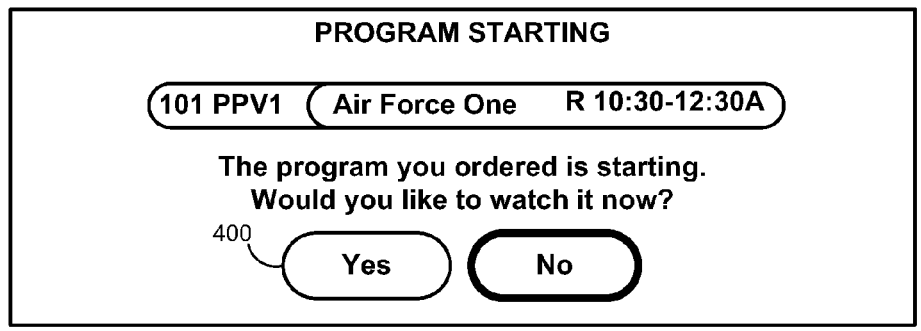
FIGS. 12a and 12b show illustrative display screens in which the program guide indicates to the user that an ordered pay-per-view program is starting.
Figure 12B:
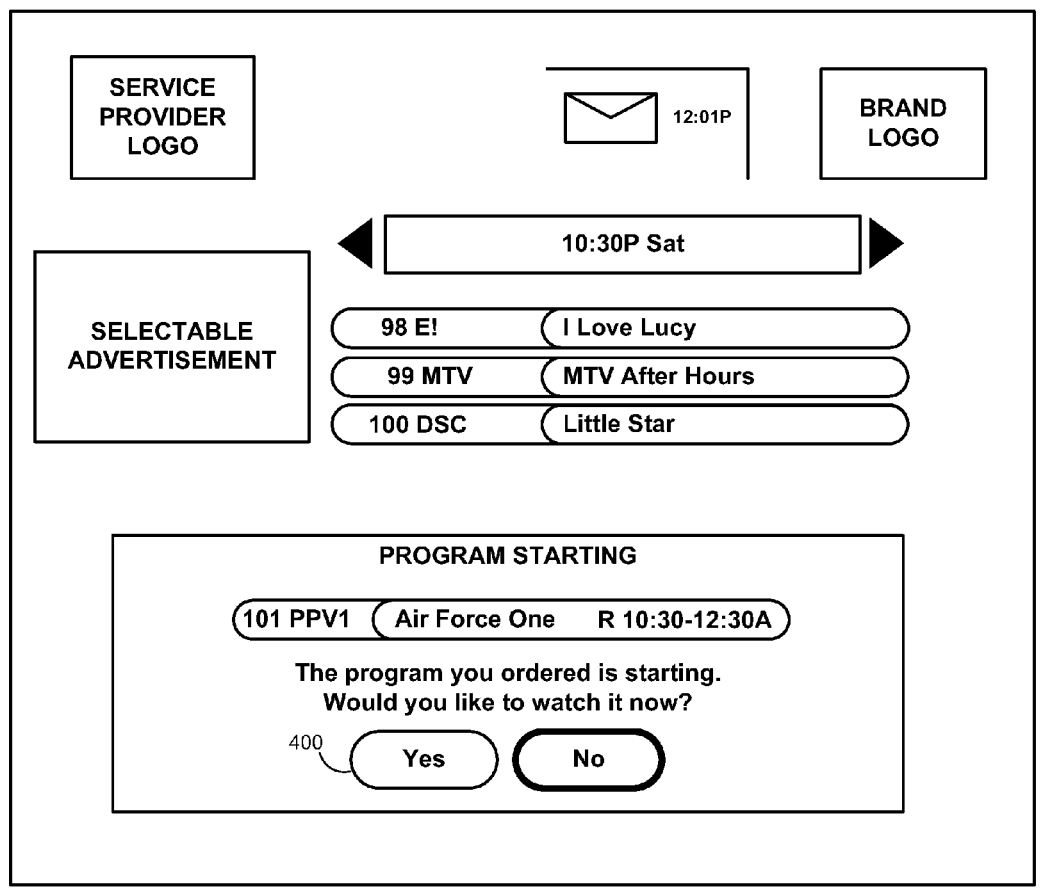

Once a pay-per-view program has been ordered, the program guide may store its unique identifier and the associated action (i.e., a pay-per-view program authorization) in a list of such actions (i.e., as a list of ordered pay-per-view programs that are to be authorized). While the user watches television or is using the program guide, the program guide may monitor the continuous data stream for unique identifiers and compare the received identifiers to the identifiers in the list. If, for example, the program guide receives the identifier for the ordered pay-per-view program when the pay-per-view program starts, the program guide may indicate to the user that the pay-per-view program is starting. The program guide may, for example, overlay a window or banner over the television program that the user is watching as shown in FIG. 12*a*, or may overlay a banner or window over a program guide display screen that the user has accessed, as shown in FIG. 12*b*. The program guide may provide the user with an opportunity to tune to the pay-per-view program by, for example, selecting "Yes" button 400 of FIGS. 12*a* and 12*b*. If desired, the program guide may prefetch program listings data or additional program data for the pay-per-view program from the continuous data stream or from program guide server 25 when the window or banner is displayed.

It is possible that a user may not have used user television equipment 22 for the period of time during which the ordered pay-per-view program was aired. The program guide may delete such entries after a predefined period of time. The program guide may also indicate to a user that the user has missed an ordered pay-per-view program. The program guide may, for example, check the list of ordered pay-per-view programs periodically (e.g., every few minutes) and may compare the stored identifiers to the unique identifiers carried in the continuous data stream. Identifiers may, for example, include a date and time component, or may be sequentially numbered based on the times the programs are broadcasted. The program guide may compare the identifiers carried on the continuous data stream to the identifiers in the list of ordered programs and may determine if any of the programs in the list have already been viewed.

Figure 13A:
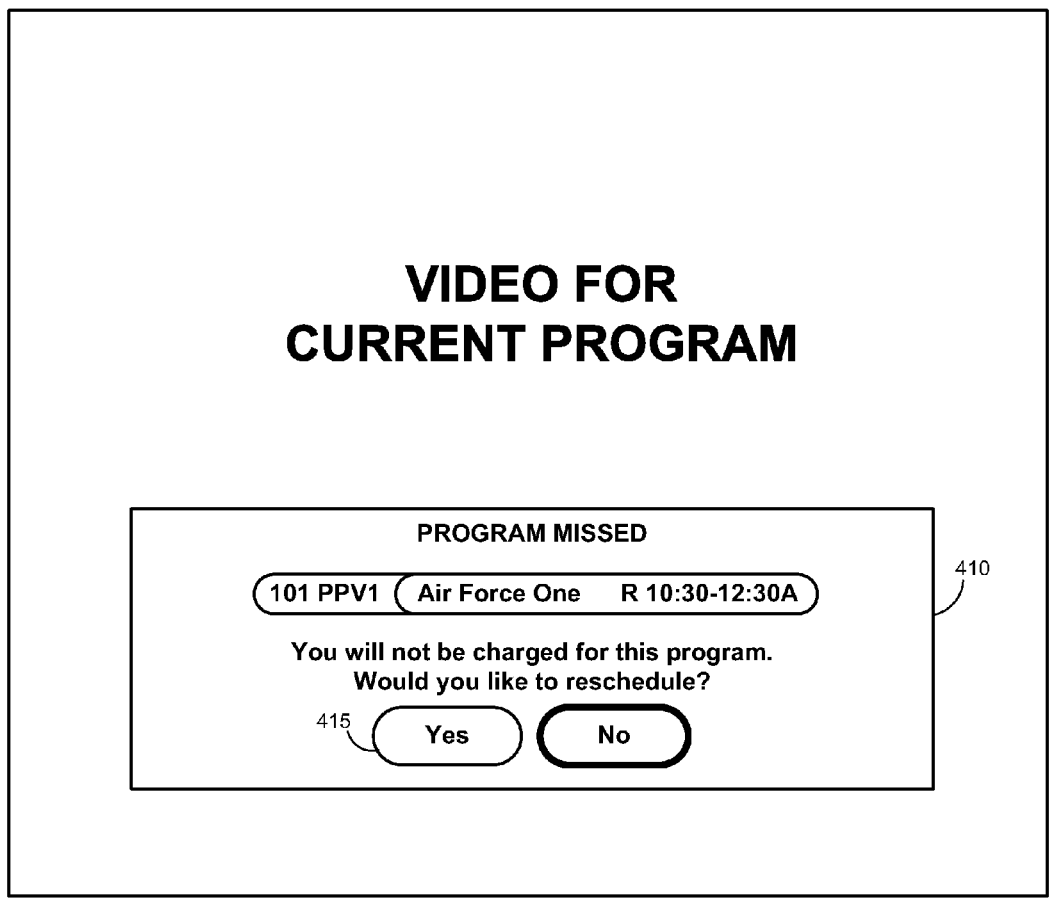
FIGS. 13a and 13b show illustrative windows in which the program guide indicates to the user that the user has missed an ordered pay-per-view program.
Figure 13B:
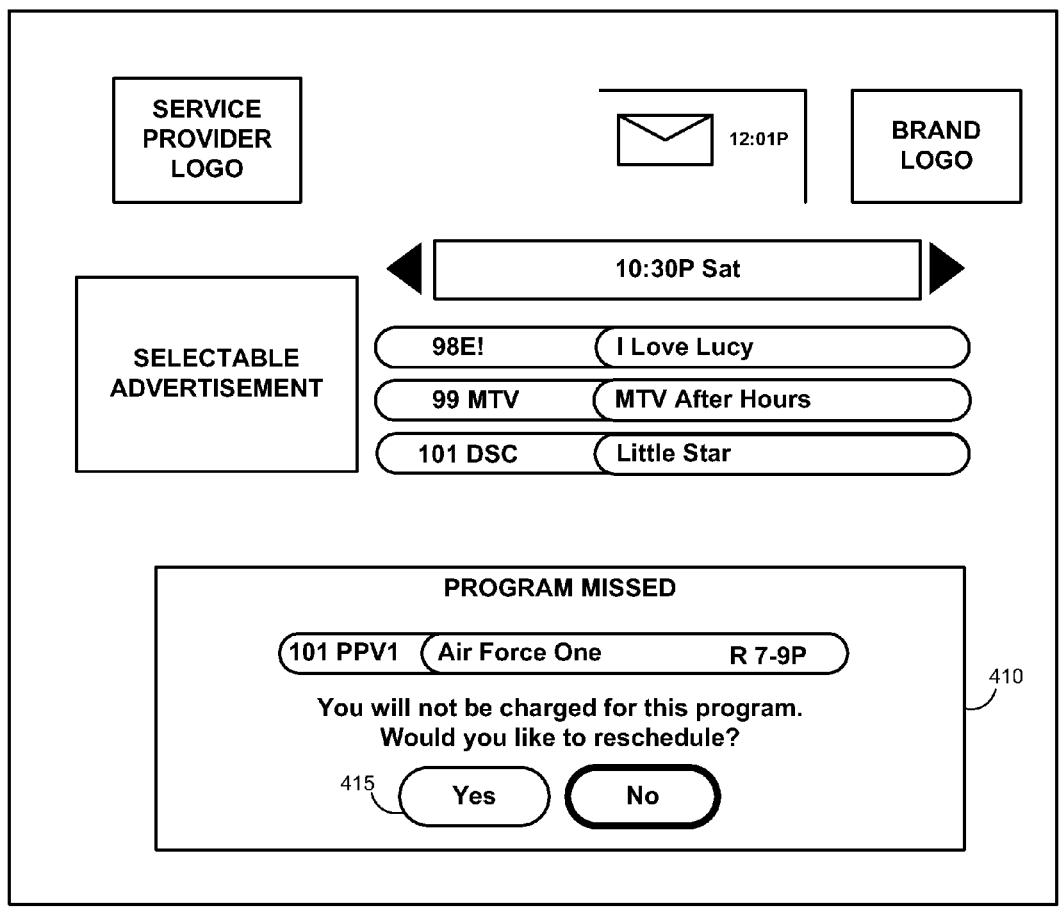

The program guide may indicate to the user that an action such as a scheduled pay-per-view program authorization is no longer current by, for example, displaying an overlay or window over a television program or program guide display screen. FIGS. 13a and 13b show illustrative windows 410 that are overlaid on top of a television program and a program guide display screen, respectively, and that display a missed pay-per-view program and prompt the user to indicate whether the user wishes to reschedule. The user may reschedule the missed pay-per-view program by, for example, selecting "Yes" button 415. The program guide may reschedule the pay-per-view program by, for example, querying program guide server 25 (FIG. 1) for the next showing of the program and storing the unique identifier for that showing of the program in a list of actions (i.e., a list of upcoming reminders, upcoming pay-per-view authorizations, etc.) with an associated action code.

The program guide may also provide a user with the opportunity to order a package of pay-per-view programs. Program guide systems that provide a user with the opportunity to purchase a package of pay-per-view programs and illustrative display screens, are described, for example, in Knudson et al. U.S. patent application Ser. No. 08/944,153, filed Oct. 6, 1997, which is hereby incorporated by reference herein in its entirety. The program guide may authorize the viewing of a pay-per-view package in a way similar to how it authorizes the viewing of a program. In response to the user indicating a desire to order a pay-per-view package, the program guide may store an identifier and the associated action (i.e., a pay-per-view program package authorization) in a list of such actions (i.e., as a list of ordered pay-per-view programs that are to be authorized).

Whenever a pay-per-view program in the package is available, the identifier for the package is transmitted in the continuous data stream. While the user watches television or is using the program guide, the program guide may monitor the continuous data stream and compare the received identifiers to the identifiers in the list. When the unique identifier for the package is transmitted, the program guide may indicate to the user that one of the ordered programs is starting.

In another suitable approach, the program guide may store the unique identifiers of each of the programs of the package in the list. Whenever a program in the package is available, its unique identifier is transmitted in the continuous data stream. The program guide may receive the unique identifiers for each program as they are aired, compare them to the list, and authorize the airing or perform another function (e.g., indicate the program is starting, indicate the program was aired, etc.).

Figure 14B:
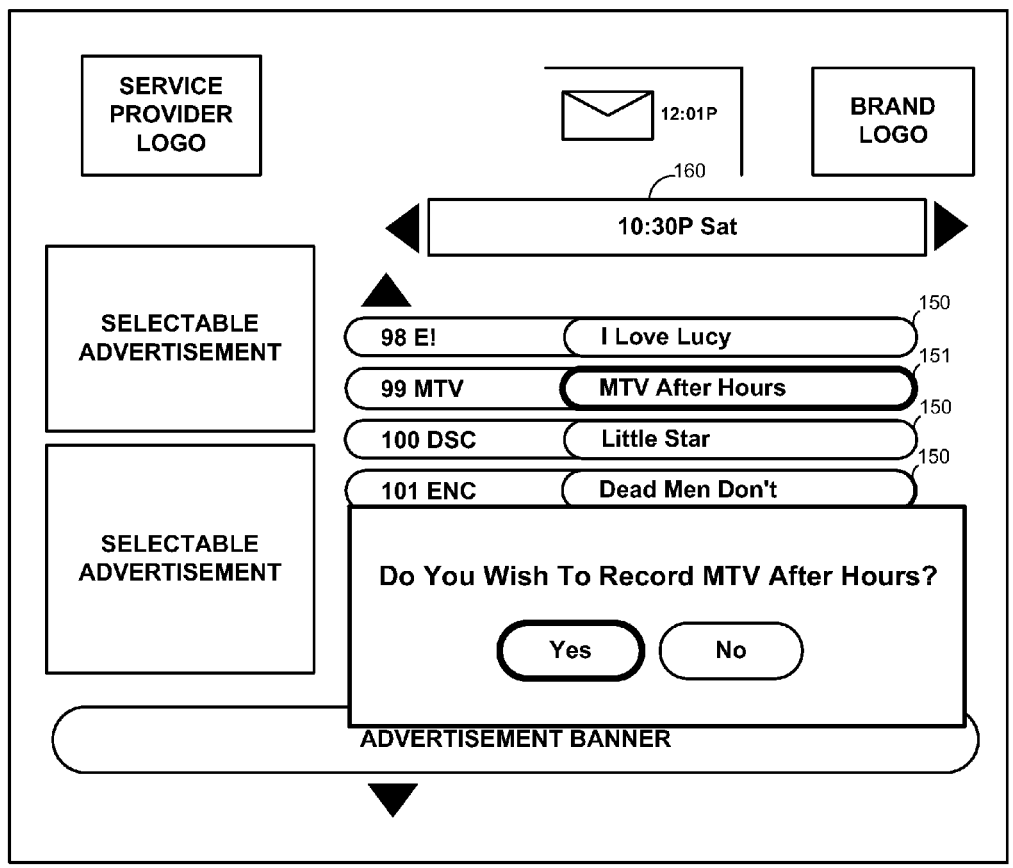

The program guide may also provide the user with the opportunity to record programs. FIGS. 14a and 14b show illustrative overlays that may be displayed by the program guide in response to a user indicating a desire to record a program. FIG. 14a may be displayed when, for example, a user indicates a desire to record the program that the user is watching (e.g., by pressing a "record" key on remote control 40). FIG. 14b shows an illustrative overlay that may be overlaid a program listings display screen when, for example, a user highlights a listing and indicates a desire to record the listing (e.g., by pressing a "record" key on remote control 40). The overlay may prompt the user to confirm the record. These ways of providing a user with the opportunity to record a program are only illustrative and any other suitable approach may be used.

After the user has indicated a desire to record a program and, if desired, confirmed the record, the program guide may save the identifier of the program and the associated action (i.e., a program record) in a list of such actions (i.e., as a list of programs to record). The program guide may also provide the user with the opportunity to record a program grouping and may save a program grouping identifier when the user indicates a desire to do so. The program guide may then monitor the continuous data stream for the unique identifier. If desired, the program guide may monitor the continuous data stream in a power-save mode. When the unique identifier for the program or program grouping is transmitted in the continuous data stream, the program guide may record the program or program grouping on digital storage device 31 or 49 (as shown in FIGS. 2 and 3, respectively), or, on secondary storage device 32 or 47 (as shown in FIGS. 2 and 3, respectively).

Figure 15A:
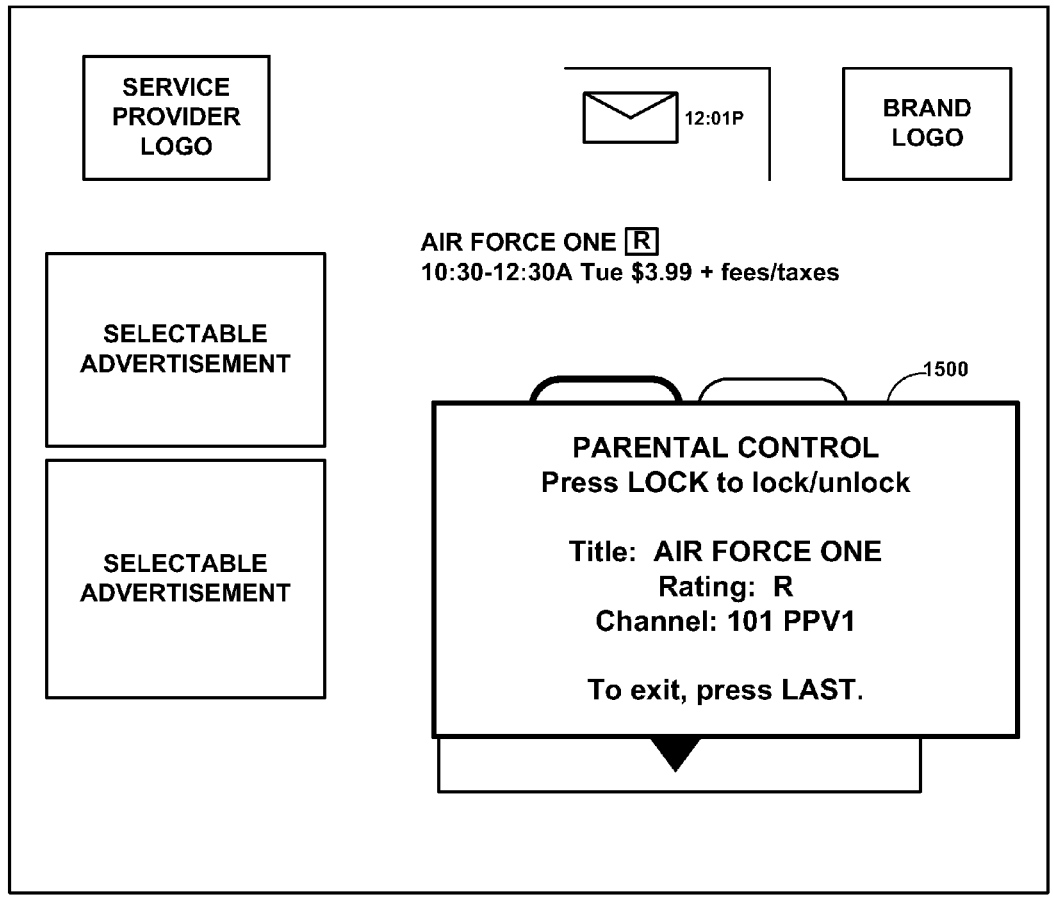
FIGS. 15a and 15b show illustrative parental control overlays that the program guide may display when a user indicates a desire to lock a program or access a locked program, respectively.

Another example of a real-time action that may be taken by the program guide is locking a program and requesting a parental control code when a user attempts to view a locked program (or program guide data for a program). Locking a program includes locking all showings of a particular program and locking all showings of programs in a program grouping. FIG. 15a shows an illustrative parental control overlay 1500 that the program guide may display in response to a user indicating a desire to lock a program. FIG. 15a shows overlay 1500 overlaid a program listings screen. The program guide may also display overlay 1500 over a program that the user is watching.

A user may indicate a desire to lock programs by, for example, highlighting its listing and pressing a "lock" key or remote control 40. In response, the program guide may display overlay 1500 and provide the user with the opportunity to, for example, lock programs by title, rating, channel, or any other suitable criteria. Locking by title includes, for example, locking all showings of a particular program and locking all showings of programs in a program grouping. In response to the user locking a program, the program guide may save the identifier of the locked program and the associated action (i.e., a program lock) in a list of such actions (i.e., as a list of locked programs). If programs have been locked by title, the program guide may, for example, store an identifier of the program grouping (e.g., a series) in the list of associated actions.

When a user tunes to a program, the program guide may obtain a unique identifier for the program (or its grouping) and compare it to identifiers in the list of identifiers. If the identifier for the program (or its grouping) is present in the list, the program guide may determine that the associated real-time action is, for example, the locking of the program. If the program guide determines that the program is locked, the program guide may display parental control overlay 1510. When the user enters the correct parental control code, the program guide may delete the unique identifier for the program from the list and display the program. Alternatively, the program guide may leave the identifier in the list (e.g., when it is a program grouping identifier) and allow the user to view the current showing.

Figure 15B:
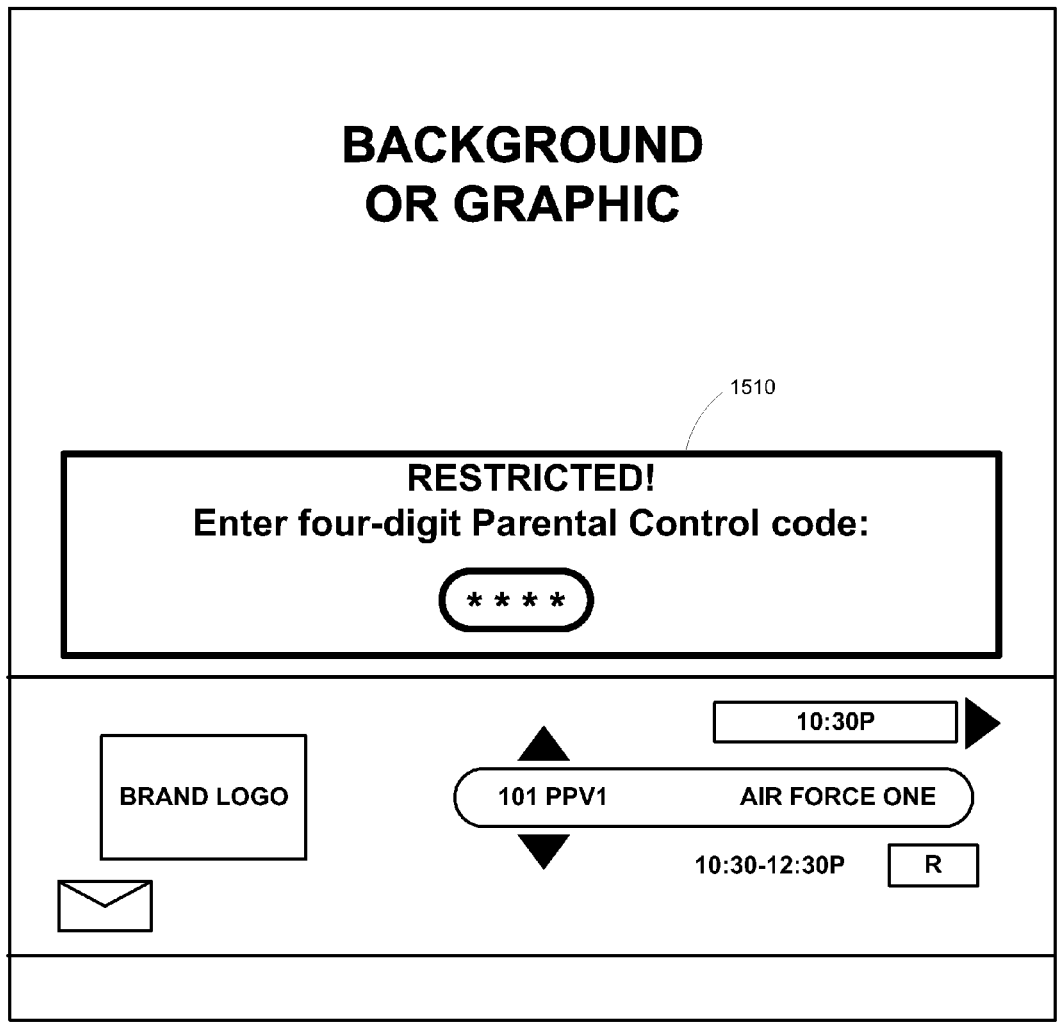

FIG. 15b shows an illustrative parental control overlay 1510 that the program guide may display when a user indicates a desire to access a program that has been parentally locked. FIG. 15b shows overlay 1510 that may be displayed when a user tunes to a locked program (e.g., by flipping to a channel as shown, turning to a channel from a browse overlay, or by tuning to a channel from another program guide display screen).

The program guide may also display parental control overlay 1510 when the user indicates a desire to access program guide data for a locked program. When the user indicates a desire to access program guide data either from the continuous data stream or from program guide server 25, the program guide may obtain the identifier for the program (or grouping), compare it to the list of identifiers, and prompt the user for a parental control code.

Figure 16:
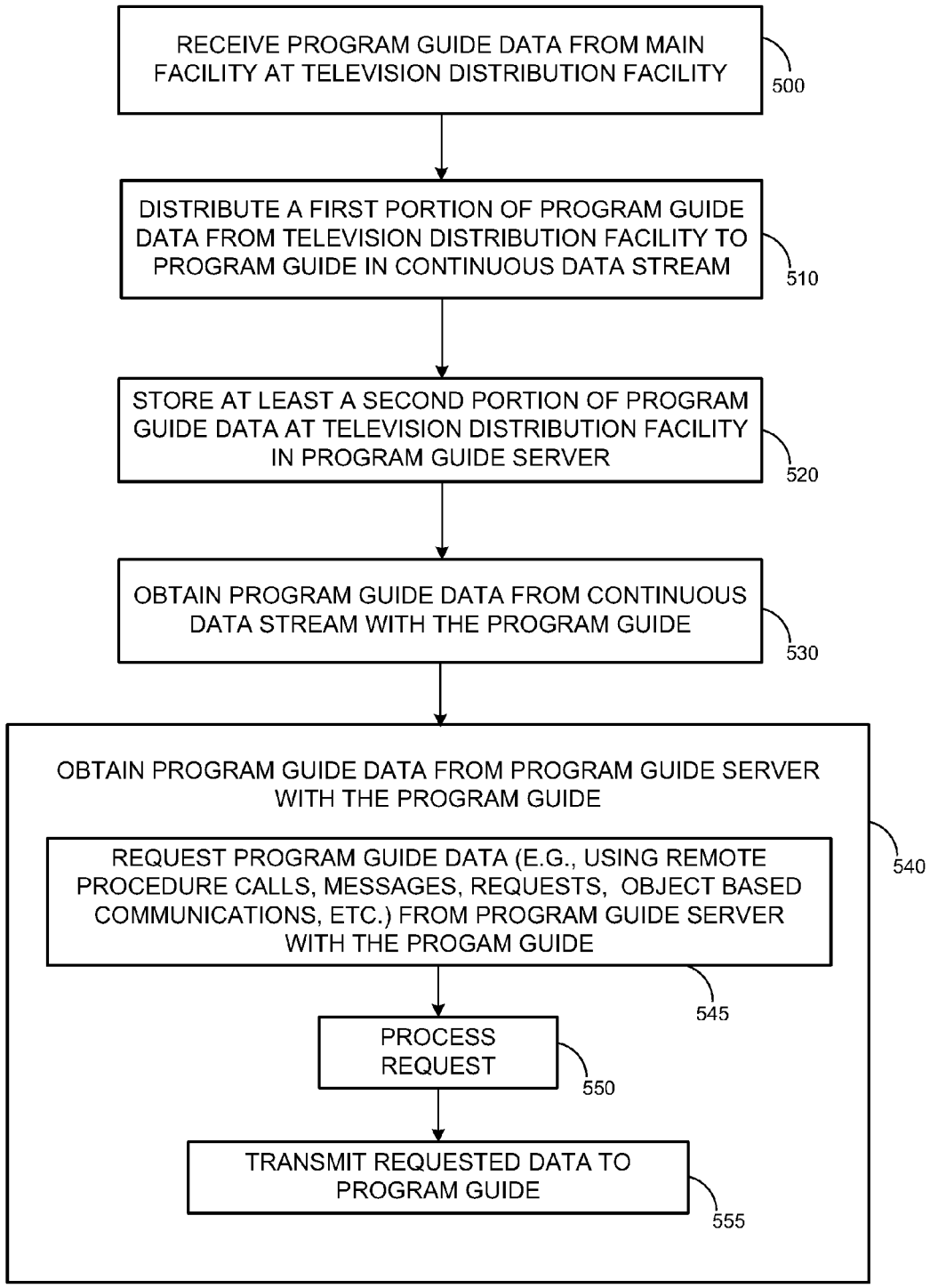
FIG. 16 is an illustrative flowchart of steps involved in obtaining program guide data with the program guide from two data delivery mechanisms in accordance with the principles of the present invention.
Figure 17:
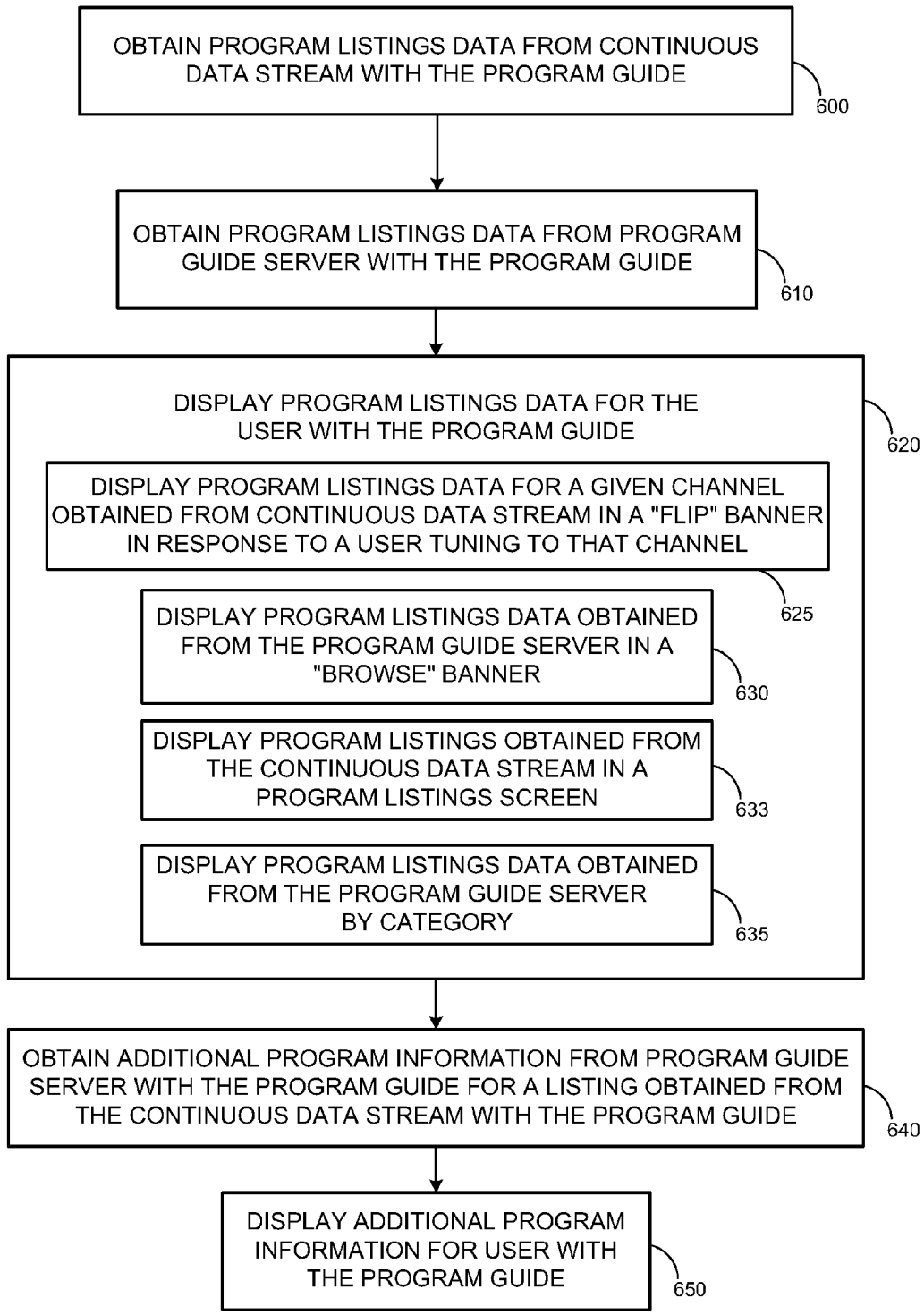
FIG. 17 is an illustrative flowchart of steps involved in providing a user with program listings data and additional program information using the program guide in accordance with the principles of the present invention.
Figure 18:
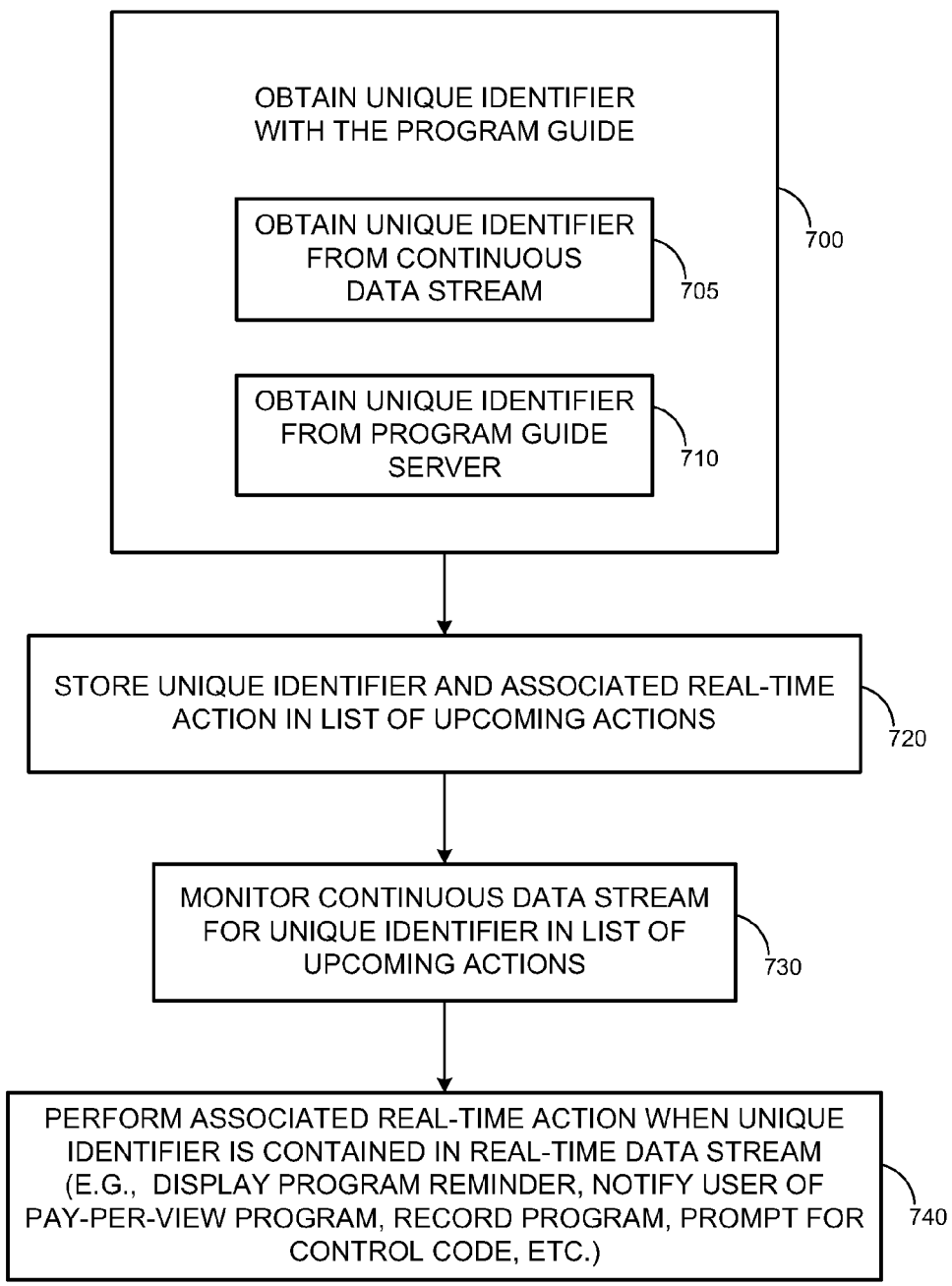
FIG. 18 is an illustrative flowchart of steps involved in performing real-time actions associated with a showing of a program in accordance with the principles of the present invention.

FIGS. 16-18 are flowcharts of illustrative steps involved in operating the interactive program guide system of the present invention. The steps shown in FIGS. 16-18 are illustrative and may be combined and performed in any suitable order.

FIG. 16 shows illustrative steps involved in obtaining program guide data with the program guide. At step 500, program guide data is received at television distribution facility 16 from main facility 12. A first portion of the program guide data is distributed by television distribution facility 16 to each of the program guides implemented on user television equipment 22 over communications paths 20 (step 510). This first portion of the program guide data may contain, for example, program guide listings data for the current time of day, unique identifiers for showings of programs for the current time of day, and any other program guide data that is to be distributed in the continuous stream of current data.

The first portion of the program guide data may be transmitted as a continuous data stream using any suitable transmission technique. It may be transmitted, for example, on a television channel sideband, in the vertical blanking interval of a television channel, on a dedicated analog or digital channel, across multiple analog or digital channels, or by any other suitable data transmission technique.

At step 520, a second portion of the program guide data is stored by program guide server 25 at television distribution facility 16. If desired, program guide server 25 may be used to store a copy of the information contained in the continuous data stream.

At steps 530 and 540, the program guide obtains program guide data from the continuous data stream and from program guide server 25, respectively. The program guide may, for example, be preprogrammed to obtain certain types of data from the continuous data stream and other types of data from program guide server 25. Alternatively, the continuous program guide data stream may contain attributes that indicate to the program guide the type of data that is contained in the data stream. Steps 530 and 540 may be performed in any suitable order, concurrently, and when the program guide is prefetching data.

If one of the links for the two delivery mechanisms is not operating properly, the program guide may temporarily use one delivery mechanism exclusively. If the link supporting server communications fails, the program guide may temporarily operate using only the continuous data stream. Only access to current program listings (or listings for the next few hours) would be provided. If the link supporting the continuous data stream fails, the program guide may temporarily operate using only the server link, although with increased latency when accessing current data.

Steps 545, 550, and 555 are illustrative steps that may be involved in obtaining program guide data from program guide server 25 with the program guide. At step 545, the program guide may request program guide data from program guide server 25. As mentioned above, the request that is issued by the program guide may include any suitable remote procedure call, message, request, object based communication, or any other suitable request. At step 550, program guide server 25 may process the request and may transmit the requested data to the program guide over communications path 20 (step 555).

FIG. 17 illustrates steps involved in providing the user with program listings data and additional program information using the program guide. At steps 600 and 610, program listings data is obtained with the program guide from the continuous data stream and program guide server 25. Steps 600 and 610 may be performed in any suitable order, concurrently, and when the program guide is prefetching data.

At step 620, the program guide displays the program listings data for the user on user television equipment 22. This may involve, for example, displaying current program listings data obtained from the continuous data stream of current data for a given channel in a FLIP display in response to a user tuning to that channel (step 625). If, for example, the user indicates a desire to browse through additional program listings for the current time or for a time period in the next few hours, the program guide may display program listings obtained from the current data stream in a BROWSE display. If the user indicates a desire to browse through additional program listings for a time slot that is more than a few hours in the future, the program guide may display program listings obtained from program guide server 25 in the BROWSE display at step 630. Program listings obtained from the continuous data stream may also be displayed in a program listings screen (step 633). Program listings obtained from program guide server 25 (e.g., the program listings for a particular category of programs more than a few hours in the future) may be displayed by the program guide in a suitable program listings by category screen (step 635).

At step 630, the program guide may obtain additional program information from program guide server 25 for a program whose title and other basic information were contained in a program listing obtained from the continuous data stream. This step may be performed by the program guide, for example, when a user selects a program listing within a program listings screen. The additional program information obtained from program guide server 25 may be displayed by the program guide for the user on user television equipment 22 at step 650.

FIG. 18 shows illustrative steps involved in using the program guide to perform real-time actions that are associated with a showing of a program. The program guide may have provided a user with an opportunity to access a program guide function that involves performing a real-time action associated with a showing of a program or with a program series or other program grouping (e.g., mini-series, orderable package, etc.). Examples of such functions and actions include recording (the real-time action is the act of starting the recording of the program), setting reminders (the real-time action is the display of the reminder just before the desired program is aired), advance pay-per-view purchasing (the real-time action is the authorization of the purchased program when that program is aired), parental control (the real-time action is the locking or unlocking of a particular program when that program is aired), etc. The program guide may obtain a unique identifier for a showing of a program, or for a series, mini-series, orderable package or other program grouping, at step 700. As indicated by steps 705 and 710, the unique identifier may be obtained from the continuous data stream or from program guide server 25, respectively. The unique identifier may, for example, be obtained by the program guide when program listings information for a program is obtained.

At step 720, the unique identifier and the associated real-time action are stored by the program guide (e.g., in a list of upcoming actions). Unique identifiers for showings of programs or for program groupings may be transmitted by television distribution facility 16 as part of the continuous data stream. The program guide may monitor the continuous data stream for the unique identifiers that have been stored by the program guide in user television equipment 22 (e.g., in the form of the list of upcoming actions or other suitable data structure) at step 730. At step 740, the program guide performs an associated real-time action when a unique identifier is detected in the continuous data stream. This may include, for example, displaying a program reminder, authorizing the viewing of a pay-per-view program, notifying a user that a pay-per-view has started, recording a program, locking a program and requesting a parental control code, etc.

Figure 19A:
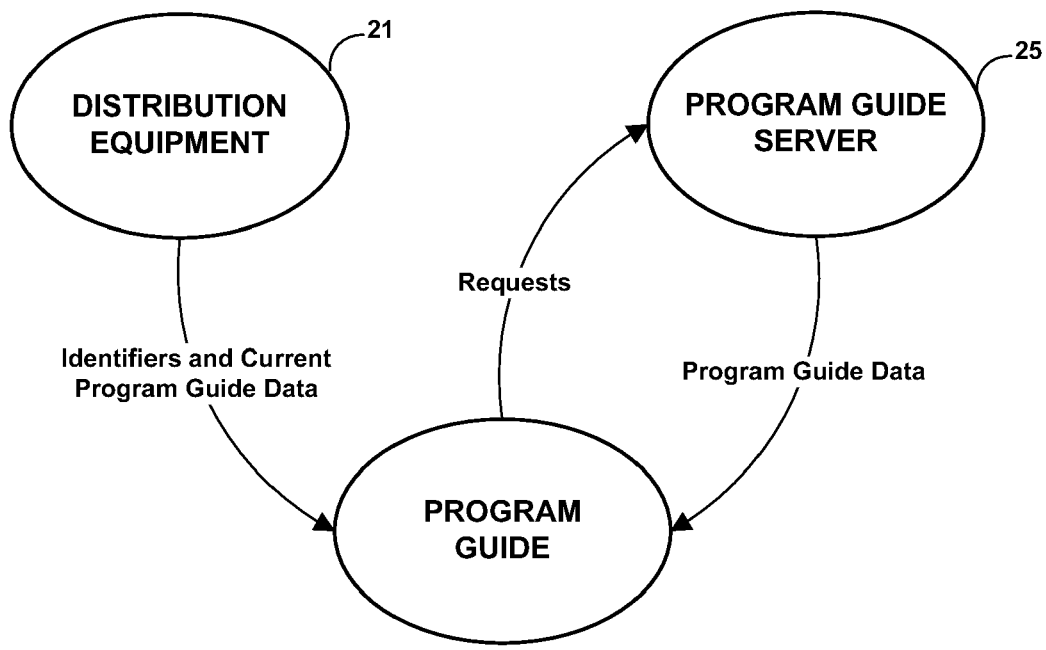
FIGS. 19a-19c show illustrative data flow diagrams of three embodiments of the interactive program guide system of the present invention in which the program guide performs real-time actions based on identifiers transmitted in a continuous data stream.
Figure 19B:
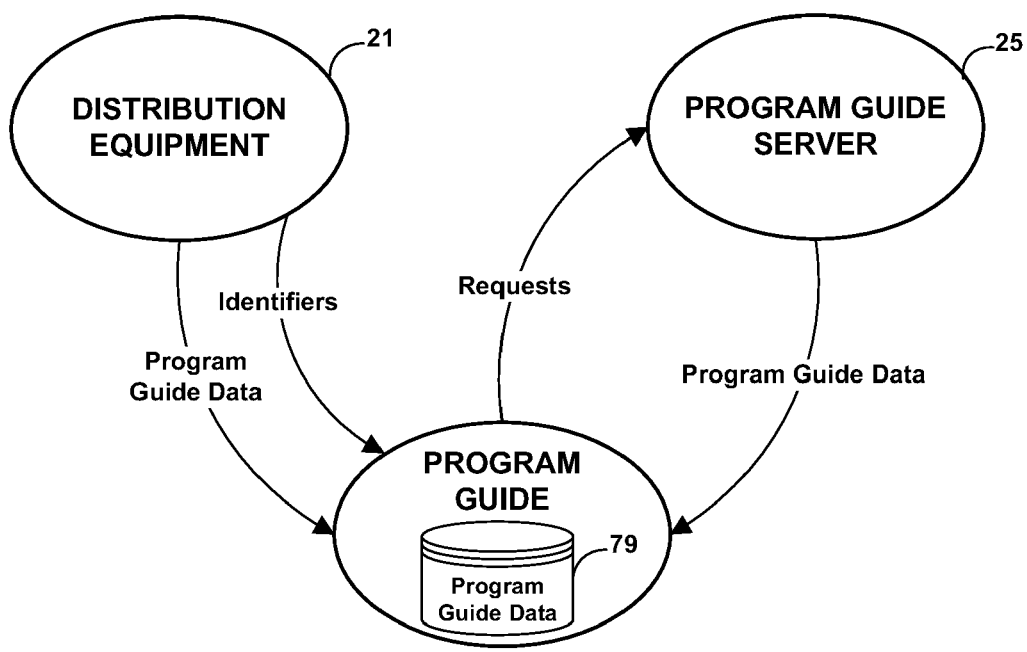
Figure 19C:
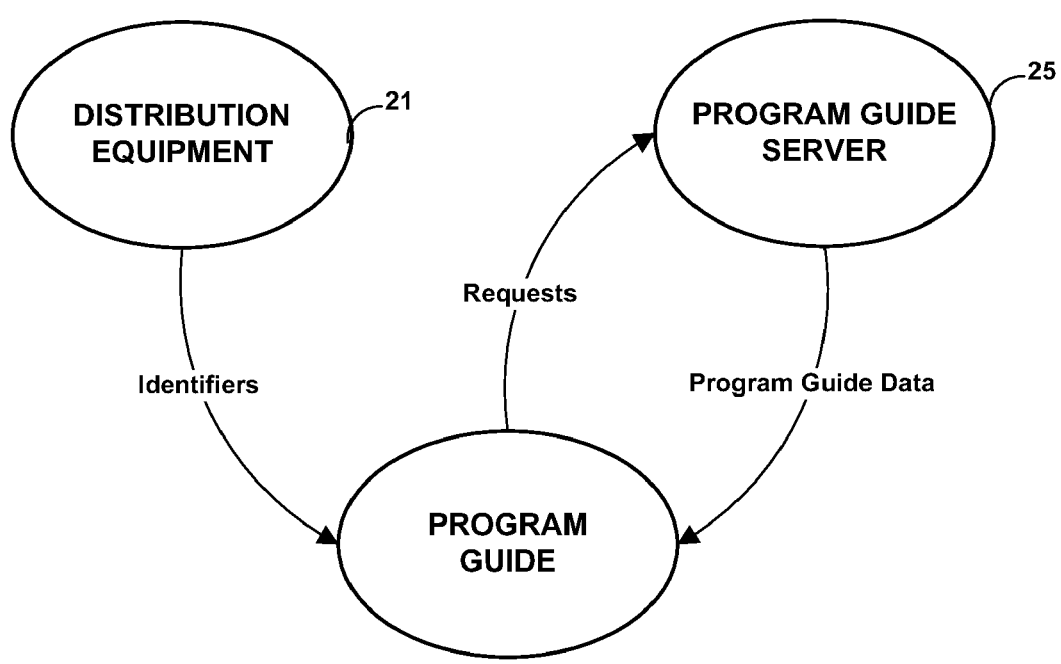

FIGS. 19a-19c show illustrative data flow diagrams of three embodiments of the interactive program guide system of the present invention in which the program guide performs real-time actions based on identifiers transmitted in a continuous data stream. In the data flow diagram of FIG. 19a, identifiers and current program guide data are obtained by the program guide from a continuous data stream transmitted by distribution equipment 21. The program guide also obtains program guide data by generating requests that are processed by program guide server 25. In this approach, the program guide does not store program guide data except for the brief time in which the program guide uses the data for display or for a prefetch. In this approach, the memory requirements of user television equipment 22 may be minimized because no database of program guide data is stored.

In the arrangement of FIG. 19b, the program guide obtains program guide data and identifiers from distribution equipment 21. The identifiers are transmitted by distribution equipment 21 in a continuous data stream. Program guide data, however, may be obtained by the program guide from a data stream transmitted by distribution equipment 21, or from program guide server 25. Program guide data may be transmitted by distribution equipment 21 in a continuous data stream, periodically, or using a suitable hybrid approach. For example, often needed data may be transmitted continuously and less urgent data transmitted periodically. Alternatively, often needed data may be transmitted periodically with a high frequency, and less urgent data may be transmitted periodically with a low frequency. In still another suitable approach, all data may be transmitted continuously but the cycle rate of some data may vary based on how often the data is needed.

Program guide data obtained either from a data stream provided by distribution equipment 21 or from program guide server 25 is stored by the program guide in program guide database 79. With this approach, user television equipment 22 (FIG. 1) may have memory for storing database 79. Database 79 would preferably contain program guide data for the current time slot and program guide data that is needed often by the program guide. If desired, program guide server 25 may be used by the program guide as, for example, a source of data supplemental to the data stored in database 79. This approach may require less memory than a system in which a significant portion of the available program guide data is stored by the program guide. In addition, the maintenance of a relatively small database of often needed data may minimize the latency of the system.

FIG. 19c shows an illustrative data flow diagram for a further embodiment of the present invention. In this embodiment, the program guide obtains program guide data only from program guide server 25. Identifiers are obtained from a continuous data stream transmitted by distribution equipment 21. This approach may allow program guide server 25 to bear all of the processing and storage burden associated with maintaining a database of program guide data, while still allowing for the program guide to perform real-time actions at the appropriate time when there is a schedule change.

The foregoing is merely illustrative of the principles of this invention and various modifications can be made by those skilled in the art without departing from the scope and spirit of the invention.

What is claimed is:

1. A system for providing program guide data that includes unique identifiers associated with programs, the system comprising:
a continuous data stream processor configured to select a particular unique identifier associated with a particular program for inclusion in a continuous data stream;
distribution equipment configured to distribute the particular unique identifier to user equipment in the continuous data stream when the particular program is currently being broadcasted; and
an interactive program guide implemented on the user equipment configured to:
monitor the continuous data stream for the presence of the particular unique identifier, wherein the presence of the particular unique identifier indicates when the particular program is being currently broadcasted;
perform a real-time action associated with the particular program when the particular unique identifier is detected in the continuous data stream; and
prefetch current program guide data from the continuous data stream when the real-time action is performed.

2. The system defined in claim 1, wherein the particular program belongs to a program grouping, and wherein the interactive program guide is configured to perform an action associated with at least one other program belonging to the program grouping when the particular unique identifier is detected in the continuous data stream.

3. The system defined in claim 1, wherein the real-time action comprises authorizing a viewing of the particular program, wherein the particular program is a pay-per-view program.

4. The system defined in claim 1, wherein the real-time action comprises displaying a program reminder for the particular program.

5. The system defined in claim 1, wherein the real-time action comprises recording the particular program.

6. The system defined in claim 1, wherein the real-time action comprises locking the particular program and prompting a user for a control code.

7. The system defined in claim 1, wherein:
the particular unique identifier is a program grouping identifier associated with a program grouping for the particular program, and wherein the interactive program guide is configured to perform an action associated with at least one other program belonging to the program grouping when the program grouping identifier is detected in the continuous data stream.

8. The system defined in claim 1 wherein:
the particular unique identifier is a program grouping identifier associated with a program grouping for the particular program; and
the real-time action comprises recording the particular program when the program grouping identifier is detected in the continuous data stream.

9. The system defined in claim 1 wherein:
the particular unique identifier is a program grouping identifier associated with a program grouping for the particular program; and the real-time action comprises locking the particular program and prompting a user for a control code when the program grouping identifier is detected in the continuous data stream.

10. The system defined in claim 1, wherein the interactive program guide is further configured to store the particular unique identifier and the real-time action associated with the particular unique identifier.

11. The system defined in claim 10, wherein interactive program guide is further configured to expire the real-time action associated with the particular unique identifier if the particular unique identifier is not detected in the continuous data stream within a predefined period of time, thereby causing the interactive program guide to halt monitoring for the presence of the particular unique identifier.

12. The system defined in claim 1, wherein:
the program guide data includes first and second types of program guide data; and
the distribution equipment is configured to distribute the first type of program guide data in the continuous data stream at a first repetition rate, and to distribute the second type of program guide data in the continuous data stream at a second repetition rate that is different from the first repetition rate.

13. The system of claim 10, wherein:
the continuous data stream processor is configured to assign a respective priority to each of the first and second types of program data; and
the distribution equipment is configured to determine the first and second repetition rates based at least in part on the respective priority assigned to the first and second types of program data.

14. A method implemented on user equipment for providing program guide data that includes unique identifiers associated with programs, the method comprising:
selecting a particular unique identifier associated with a particular program for inclusion in a continuous data stream;
distributing the particular unique identifier to the user equipment in the continuous data stream only when the particular program is being currently broadcasted;
monitoring the continuous data stream for the presence of the particular unique identifier, wherein the presence of the particular unique identifier indicates when the particular program is being currently broadcasted;
performing a real-time action associated with the particular program when the particular unique identifier is detected in the continuous data stream; and
prefetching current program guide data from the continuous data stream by the interactive program guide when the real-time action is performed.

15. The method defined in claim 14, wherein the particular program belongs to a program grouping, the method further comprising performing an action associated with at least one other program belonging to the program grouping when the particular unique identifier is detected in the continuous data stream.

16. The method defined in claim 14, wherein performing the real-time action comprises authorizing a viewing of the particular program, wherein the particular program is a pay-per-view program.

17. The method defined in claim 14, wherein performing the real-time action comprises displaying a program reminder for the particular program.

18. The method defined in claim 14, wherein performing the real-time action comprises recording the particular program.

19. The method defined in claim 14, wherein performing the real-time action comprises locking the particular program and prompting a user for a control code.

20. The method defined in claim 14, wherein one or more of the unique identifiers is a program grouping identifier associated with a program grouping for the particular program, the method further comprising performing an action associated with at least one other program belonging to the program grouping when the program grouping identifier is detected in the continuous data stream.

21. The method defined in claim 14, wherein the particular unique identifier is a program grouping identifier associated with a program grouping for the particular program, and wherein performing the real-time action comprises recording the particular program when the program grouping identifier is detected in the continuous data stream.

22. The method defined in claim 14, wherein the particular unique identifiers is a program grouping identifier associated with a program grouping for the particular program, and wherein performing the real-time action comprises locking the particular program and prompting a user for a control code when the program grouping identifier is detected in the continuous data stream.

23. The method defined in claim 14 further comprising storing the unique identifier and the real-time action associated with the unique identifier.

24. The method defined in claim 23, further comprising expiring the real-time action associated with the unique identifier if the unique identifier is not detected in the continuous data stream within a predefined period of time, thereby halting the monitoring for the presence of the unique identifier.

25. The method defined in claim 14, wherein the program guide data includes first and second types of program guide data, the method further comprising:
distributing the first type of program guide data in the continuous data stream at a first repetition rate; and
distributing the second type of program guide data in the continuous data stream at a second repetition rate that is different from the first repetition rate.

26. The method defined in claim 25 further comprising:
assigning to each of the first and second types of program data a respective priority; and
determining the first and second repetition rates based at least in part on the respective priority assigned to the first and second types of program data.

* * * * *